United States Patent
Ito et al.

(10) Patent No.: US 11,481,292 B2
(45) Date of Patent: Oct. 25, 2022

(54) STORAGE SYSTEM AND CONTROL METHOD THEREFOR

(71) Applicant: Hitachi, Ltd., Tokyo (JP)

(72) Inventors: Shintaro Ito, Tokyo (JP); Takahiro Yamamoto, Tokyo (JP); Sachie Tajima, Tokyo (JP); Masakuni Agetsuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/198,390

(22) Filed: Mar. 11, 2021

(65) Prior Publication Data

US 2022/0100616 A1   Mar. 31, 2022

(30) Foreign Application Priority Data

Sep. 28, 2020   (JP) .............................. JP2020-162490

(51) Int. Cl.
| | | |
|---|---|---|
| G06F 11/00 | (2006.01) | |
| G06F 11/20 | (2006.01) | |
| G06F 11/10 | (2006.01) | |
| G06F 3/06  | (2006.01) | |

(52) U.S. Cl.
CPC ........ *G06F 11/2023* (2013.01); *G06F 3/0619* (2013.01); *G06F 3/0659* (2013.01); *G06F 3/0689* (2013.01); *G06F 11/1096* (2013.01)

(58) Field of Classification Search
CPC ............. G06F 11/2023; G06F 11/1096; G06F 3/0619; G06F 3/0659; G06F 3/0689
USPC ...................................... 714/1–57
See application file for complete search history.

(56) References Cited

U.S. PATENT DOCUMENTS

| | | |
|---|---|---|
| 9,985,875 B1 | 5/2018 | Srinath et al. |
| 10,503,612 B1 | 12/2019 | Wang et al. |
| 2003/0177324 A1* | 9/2003 | Timpanaro-Perrotta ..................... G06F 11/1448 711/158 |
| 2005/0198552 A1 | 9/2005 | Baba et al. |
| 2006/0015773 A1* | 1/2006 | Singh .................. G06F 11/2046 714/13 |
| 2007/0038885 A1 | 2/2007 | Hartung |

(Continued)

FOREIGN PATENT DOCUMENTS

| | | |
|---|---|---|
| JP | 2019-101703 A | 6/2019 |
| JP | 2020-047215 A | 3/2020 |

OTHER PUBLICATIONS

U.S. Appl. No. 17/478,109, filed Sep. 17, 2021.

(Continued)

*Primary Examiner* — Sarai E Butler
(74) *Attorney, Agent, or Firm* — Baker Botts L.L.P.

(57) ABSTRACT

Each redundancy group is constituted by one active program (storage control software of the active program) and N standby programs (N is an integer of two or more). Each of the N standby programs is associated with a priority to be determined as a failover (FO) destination. In the same redundancy group, FO is performed from the active program to the standby program based on the priority. For the plurality of pieces of storage control software including the active programs and the standby programs that change to be active by FO in the plurality of redundancy groups arranged in the same node, standby storage control software that can set each of the programs as a FO destination are arranged in different nodes.

9 Claims, 24 Drawing Sheets

(56) References Cited

U.S. PATENT DOCUMENTS

| | | | |
|---|---|---|---|
| 2007/0220323 A1* | 9/2007 | Nagata | G06F 11/2046 |
| | | | 714/E11.073 |
| 2009/0327364 A1* | 12/2009 | Schwan | G06F 11/2094 |
| | | | 709/204 |
| 2010/0042673 A1 | 2/2010 | Dayley | |
| 2010/0198972 A1* | 8/2010 | Umbehocker | H04L 67/1097 |
| | | | 709/226 |
| 2012/0198269 A1 | 8/2012 | Gupta et al. | |
| 2012/0239988 A1* | 9/2012 | Morimoto | G06F 11/2035 |
| | | | 714/49 |
| 2014/0281524 A1* | 9/2014 | Legacy | H04L 63/20 |
| | | | 713/168 |
| 2015/0286531 A1* | 10/2015 | Bondurant | G06F 11/2094 |
| | | | 714/6.23 |
| 2015/0309882 A1* | 10/2015 | Harrison | G06F 16/27 |
| | | | 707/645 |
| 2016/0011936 A1* | 1/2016 | Luby | G06F 3/067 |
| | | | 714/6.2 |
| 2019/0102260 A1 | 4/2019 | Yang et al. | |
| 2019/0163593 A1* | 5/2019 | Agetsuma | G06F 11/2094 |
| 2019/0235918 A1 | 8/2019 | Liu et al. | |
| 2019/0286533 A1* | 9/2019 | O'Mahony | G06F 21/568 |
| 2020/0097204 A1 | 3/2020 | Sato et al. | |
| 2020/0110675 A1 | 4/2020 | Wang et al. | |

OTHER PUBLICATIONS

U.S. Appl. No. 17/478,109, Non-Final Office Action dated Jan. 6, 2022.

Notice of Reasons for Refusal, dated Jul. 5, 2022, for Japanese Application No. 2020-162490 (with English translation).

\* cited by examiner

STANDBY ARRANGEMENT CONDITION IN QUADRUPLICATION:

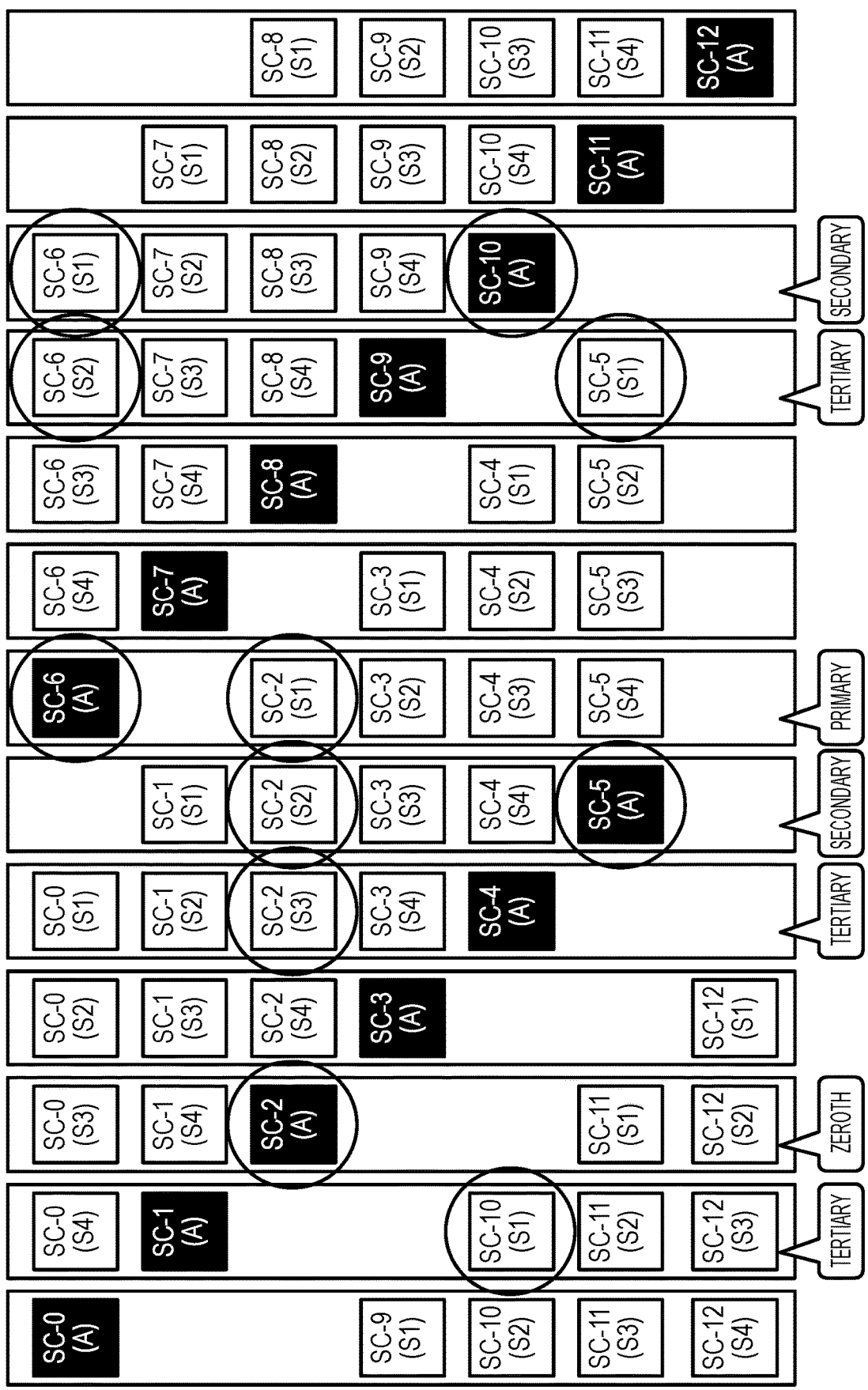

STORAGE SYSTEM AND CONTROL METHOD THEREFOR

BACKGROUND OF THE INVENTION

1. Field of the Invention

The present invention generally relates to a storage system and a control method therefor, and is suitable to be applied to, for example, an information processing system including a plurality of storage nodes on which one or a plurality of software-defined storages (SDSs) are mounted.

2. Description of the Related Art

Conventionally, in an information processing system, a redundant configuration of a server device is often adopted in order to improve the availability and reliability.

For example, JP 2019-101703 A discloses a technique for enhancing the availability of storage control software while efficiently using a server by deploying active storage control software that belongs to a redundancy group and (standby) storage control software of a standby system that belongs to another redundancy group on the same server.

SUMMARY OF THE INVENTION

In order to ensure the availability in the case where a failure occurs in two or more servers, it is conceivable to set the number of pieces of standby storage control software in each of the redundancy groups to two or more, that is, to set the number of pieces of storage control software constituting each of the redundancy groups to three or more. In this case, if two servers fail, three pieces of active storage control software can run on one server. As a result, there occurs a problem that a load is concentrated on one server and the I/O performance is lowered, and a problem that the memory consumption increases.

In order to avoid such problems, it is possible to consider a method of migrating the two pieces of active storage control software already running when the second server has failed in advance to another server. In such a method, however, it is difficult to start failover of the active control software of the server that has failed due to the process of migrating the storage control software, and the I/O stop time is extended.

As another method, it is possible to consider a method of migrating active control software in a server in which standby control software exists to another server in advance when there is only one standby storage control software left in a redundancy group. In such a method, however, the I/O performance of the server that has not failed deteriorates due to the process of migrating the storage control software.

As still another method, when a server fails, it is possible to consider a method of selecting any standby storage control software to be activated among a plurality of pieces of standby storage control software in a redundancy group that includes active storage control software on the server that has failed based on the number of pieces of active storage control software in each of the other servers. However, this method requires inter-node communication to detect the number of pieces of active storage control software in each of the other storages when a storage node fails so that it takes time until the completion of failover. As a result, the I/O stop time is extended.

For each redundancy group constituted by (N+1) pieces of storage control software, one piece of storage control software is an active program which is active storage control software, and each of the remaining N pieces of storage control software is a standby program which is standby storage control software. Each of the N standby programs is associated with a priority to be determined as a failover destination. When a storage node where the active program is arranged fails, failover within the redundancy group from the active program to the standby program with the highest priority is performed. An arrangement condition of a redundancy group α is that at most k standby programs among the N standby programs in the redundancy group α are arranged in k-th order or lower influential nodes of all redundancy groups β for the redundancy group α. The redundancy group β for the redundancy group α is a redundancy group including active programs arranged in m-th order influential nodes of the redundancy group α (m is a natural number and m<N). The m-th order influential node of the redundancy group α is a storage node in which a standby program with a priority m in the redundancy group α is arranged. A storage node where the active program is arranged in the redundancy group α is a zeroth-order influential node. A storage node where a standby program with a priority k (k is a natural number and 1≤k≤(N−m)) in the redundancy group β for the redundancy group α is arranged is an (m+k)-th order influential node of the redundancy group α.

According to the present invention, it is possible to ensure the availability in the case where a failure occurs in two or more storage nodes while avoiding concentration of resource consumption.

BRIEF DESCRIPTION OF THE DRAWINGS

FIG. 24 illustrates an example of arrangement of the storage control unit according to the third embodiment.

DESCRIPTION OF EMBODIMENTS

Figure 1:
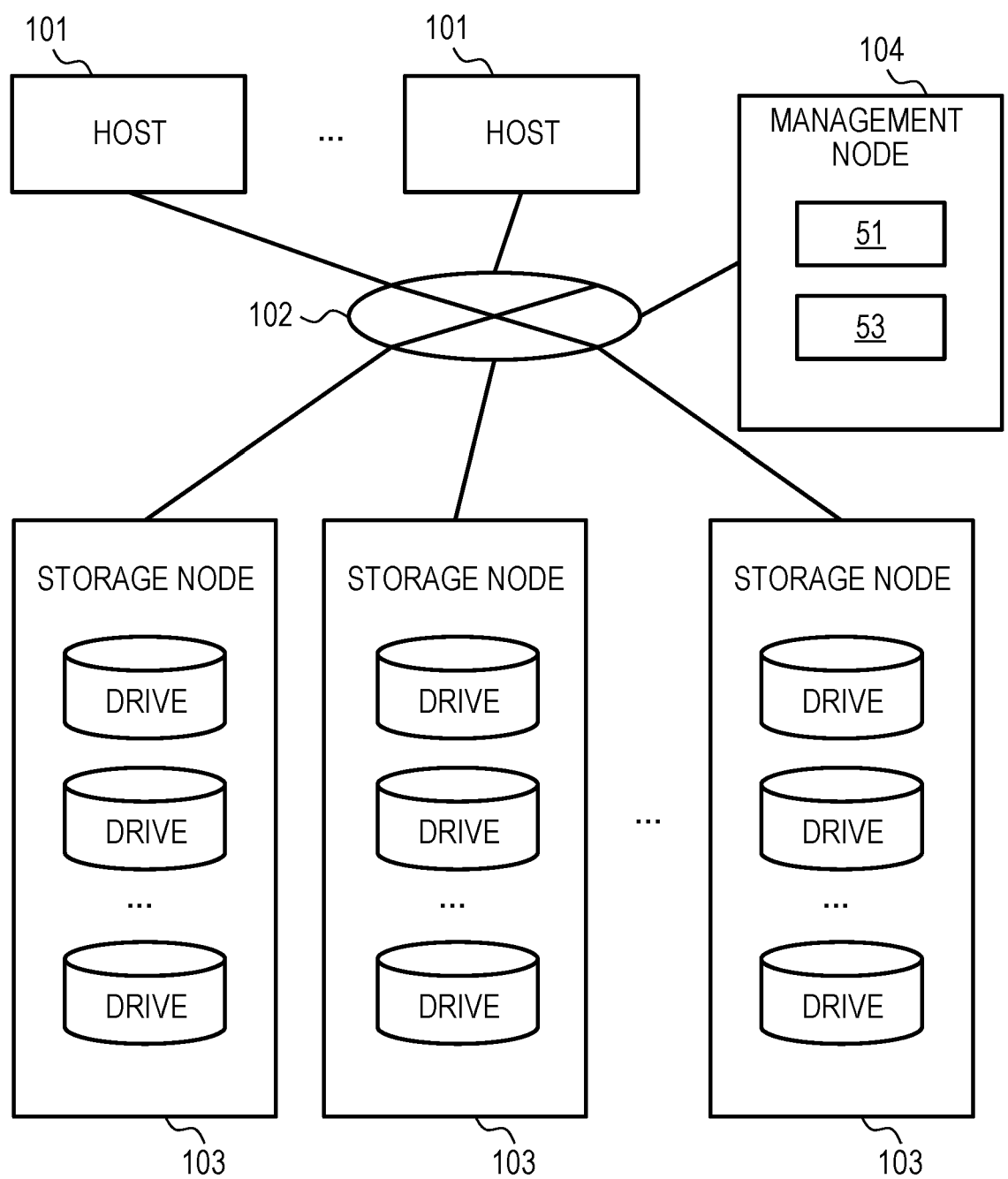
FIG. 1 illustrates a configuration example of an information processing system according to a first embodiment.

In the following description, an "interface device" may be one or more interface devices. The one or more interface devices may be at least one of the following.

One or more input/output (I/O) interface devices. The input/output (I/O) interface device is an interface device for at least one of an I/O device and a remote display computer. The I/O interface device for the display computer may be a communication interface device. The at least one I/O device may be a user interface device, for example, either an input device such as a keyboard and a pointing device or an output device such as a display device.

One or more communication interface devices. The one or more communication interface devices may be one or more homogeneous communication interface devices (for example, one or more network interface cards (NICs)), or may be two or more heterogeneous communication interface devices (for example, NIC and a host bus adapter (HBA)).

In the following description, a "memory" represents one or more memory devices, and may typically be a main storage device. At least one memory device in the memory may be a volatile memory device or a non-volatile memory device.

In the following description, a "storage device" may be one or more permanent storage devices. The persistent storage device may be typically a non-volatile storage device (for example, auxiliary storage device), and, specifically, may be a hard disk drive (HDD), a solid state drive (SSD), a non-volatile memory express (NVME) drive, or a storage class memory (SCM), for example.

In addition, a "processor" may be one or more processor devices in the following description. The at least one processor device may be typically a microprocessor device such as a central processing unit (CPU), but may be another type of processor device such as a graphics processing unit (GPU). The at least one processor device may be a single-core or multi-core processor. At least one processor device may be a processor core. At least one processor device may be a processor device in a broad sense such as a circuit that is an aggregation of gate arrays in a hardware description language that performs some or all of processes (for example, a field-programmable gate array (FPGA), a complex programmable logic device (CPLD), or an application specific integrated circuit (ASIC)).

In addition, there is a case where processing is described with a "program" as a subject in the following description, but the subject of the processing may be a processor (or a device such as a controller having the processor) since the program is executed by the processor to perform the prescribed processing appropriately using a storage device and/or an interface device. The program may be installed on a device such as a computer from a program source. The program source may be a recording medium (for example, a non-transitory recording medium) readable by, for example, a program distribution server or a computer. In addition, in the following description, two or more programs may be realized as one program, or one program may be realized as two or more programs.

In addition, in the following description, reference signs are used in the case of describing the same type of elements without discrimination, and identification information assigned to elements (for example, codes or numbers) are used in the case of describing the same type of elements with discrimination.

Hereinafter, some embodiments of the present invention will be described in detail with reference to the drawings.

(1) First Embodiment (1-1) Configuration of Information Processing System According to Present Embodiment FIG. 1 illustrates a configuration example of an information processing system according to the present embodiment.

This information processing system includes a plurality of host devices 101, a plurality of storage nodes 103, and a management node 104 connected to each other via a network 102 configured using, for example, a fiber channel, Ethernet (registered trademark), a local area network (LAN), or the like.

The host device 101 is a general-purpose computer device that transmits a read request or a write request (hereinafter, as appropriate, collectively referred to as an input/output (I/O) request) to the storage node 103 in response to a user's operation or a request from a mounted application program. Note that the host device 101 may be a virtual computer device such as a virtual machine.

Figure 2:
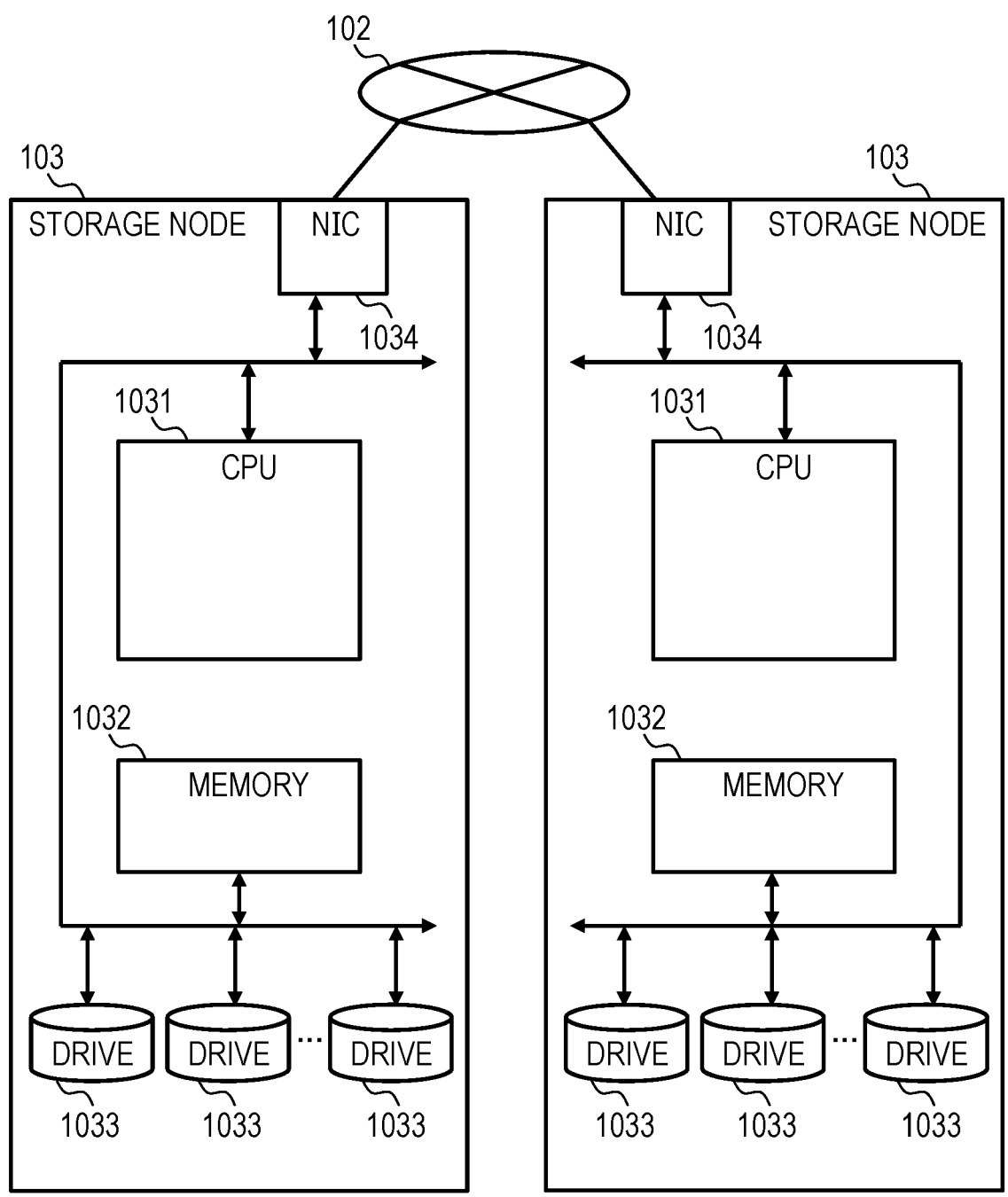
FIG. 2 illustrates a physical configuration example of a storage node according to the first embodiment.

Specifically, for example, the storage node 103 is a physical server device that provides a storage area to read and write data from and to the host device 101, and includes a central processing unit (CPU) 1031, a memory 1032, a plurality of storage devices 1033, and a communication device 1034 as illustrated in FIG. 2. The CPU 1031 is an example of the processor. The plurality of storage devices 1033 are examples of the storage device. The communication device 1034 is an example of the interface device.

The CPU 1031 is a device that controls the entire operation of the storage node 103. The memory 1032 is configured using a volatile semiconductor memory such as a static random access memory (RAM) (SRAM) and a dynamic RAM (DRAM), and is used to temporarily hold various programs and necessary data. When the CPU 1031 executes the program stored in the memory 1032, various processes as a whole of the storage node 103, which will be described later, are executed.

The storage device 1033 is configured using one or a plurality of types of large-capacity non-volatile storage devices, such as a solid state drive (SSD), a serial attached small computer system interface (SCSI) (SAS) hard disk drive or a serial advanced technology attachment (ATA) (SATA) hard disk drive, and provides a physical storage area to read/write data in response to a write/read request (hereinafter referred to as an input/output (I/O) request) from host device 101 (FIG. 1).

The communication device 1034 is an interface configured for the storage node 103 to communicate with the host device 101 and the other storage node 103 or the management node 104 via the network 102 (FIG. 1), and is configured using, for example, a network interface card (NIC), a fiber channel (FC) card, or the like. The communication device 1034 performs protocol control during communication with the host device 101, the other storage node 103, or the management node 104.

The management node 104 is a computer device used by a system administrator to manage the entire information processing system. The management node 104 may manage the plurality of storage nodes 103 as a group called a "cluster". Although FIG. 1 illustrates an example in which only one cluster is provided, a plurality of clusters may be provided in the information processing system. In addition, the management node 104 may include, for example, an interface device, a storage device, a memory, and a processor connected to these parts. The storage device or the memory may store information such as configuration information 51 and a program to realize an arrangement control unit 53. The configuration information 51 may include, for example, an identification number for each node and an identification number for each redundancy group to be described later. The arrangement control unit 53 may be realized as the processor executes the program. The arrangement control unit 53 may determine any storage node 103 in which any storage control unit is arranged based on the configuration information 51, and arrange the storage control unit in the storage node 103 determined as the arrangement destination. Instead of the automatic arrangement of the storage control unit based on the configuration information 51 performed by the arrangement control unit 53, the arrangement control unit 53 may arrange the storage control unit in response to an operation from a user (for example, administrator).

Figure 3:
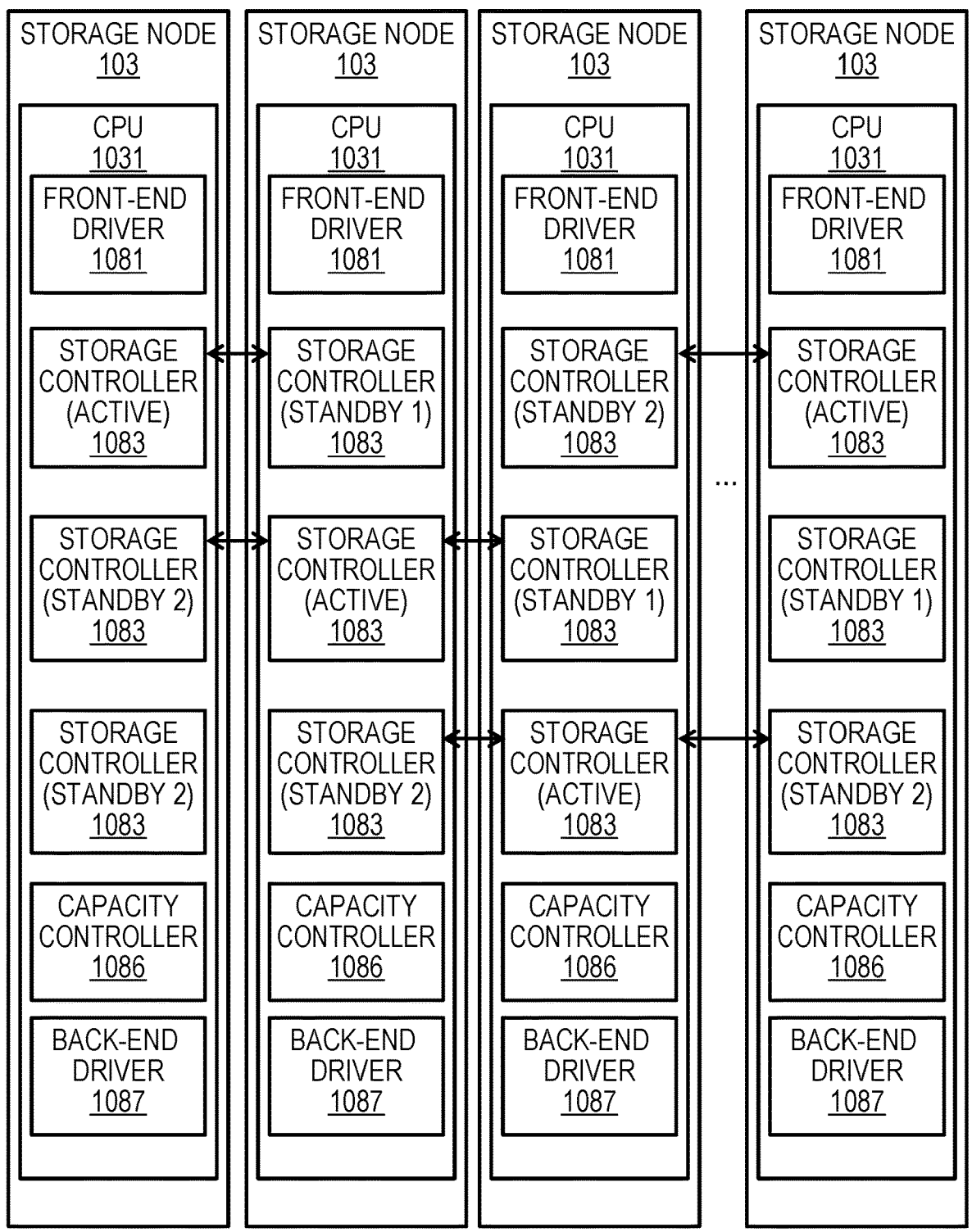
FIG. 3 illustrates a logical configuration example of the storage node according to the first embodiment.

FIG. 3 illustrates a logical configuration example of the storage node 103.

As illustrated in FIG. 3, each of the storage nodes 103 includes a front-end driver 1081, a back-end driver 1087, one or a plurality of storage control units 1083, and a capacity control unit 1086.

The front-end driver 1081 is software that functions to control the communication device 1034 (FIG. 2) and to provide an abstract interface to the CPU 1031 (FIG. 2) during the communication with the host device 101, the other storage node 103, or the management node 104 for the storage control unit 1083. The back-end driver 1087 is software that functions to control each of the storage devices 1033 (FIG. 2) in the own storage node 103 and to provide an abstract interface during the communication with these storage devices 1033 to the CPU 1031.

The storage control unit 1083 is software that functions as a controller of a software defined storage (SDS), and is an example of storage control software. The storage control unit 1083 receives an I/O request from the host device 101, and issues an I/O command in response to the I/O request to the capacity control unit 1086.

In the present embodiment, the respective storage control units 1083 mounted on the storage node 103 are managed as a group that constitutes a redundant configuration together with two or more storage control units 1083 arranged in two or more other storage nodes 103. Hereinafter, this group will be referred to as a "redundancy group".

Note that FIG. 3 illustrates a case where one redundancy group is constituted by the three storage control units 1083. The following description will be given also assuming that the redundancy group is constituted by the three storage control units 1083 (that is, triple storage control unit 1083).

In the redundancy group, one storage control unit 1083 is set to a state of being capable of receiving an I/O request from the host device 101 (an active state, which will be referred to as an active mode hereinafter), and each of the remaining storage control units 1083 is set to a state of not receiving a read request or a write request from the host device 101 (standby state, which will be referred to as a standby mode hereinafter).

In the redundancy group, when failure occurs in the storage control unit 1083 set to the active mode (hereinafter referred to as the active storage control unit 1083) or the storage node 103 where the active storage control unit 1083 is arranged, a state of the storage control unit 1083 that has been set to the standby mode until then (hereinafter referred to as the standby storage control unit 1083) is switched to the active mode. In the redundancy group including this active storage control unit 1083, failover from the active storage control unit 1083 to the standby storage control unit 1083 is performed. As a result, when the active storage control unit 1083 fails to operate, the standby storage control unit 1083 can take over the I/O processing which has been executed by the active storage control unit 1083.

The capacity control unit 1086 is software that functions to allocate a physical storage area provided by the storage device 1033 in the own storage node 103 or the other storage node 103 to each redundancy group, and to read/write specified data to the corresponding storage device 1033 according to the above I/O command given by the storage control unit 1083.

In this case, when allocating the physical storage area provided by the storage device 1033 in the other storage node 103 to the redundancy group, the capacity control unit 1086 exchanges data with the capacity control unit 1086 via the network 102 in cooperation with the capacity control unit 1086 mounted on the other storage node 103, thereby reading/writing the data from/to the storage area according to the I/O command given by the active storage control unit 1083 of the redundancy group.

Figure 4:
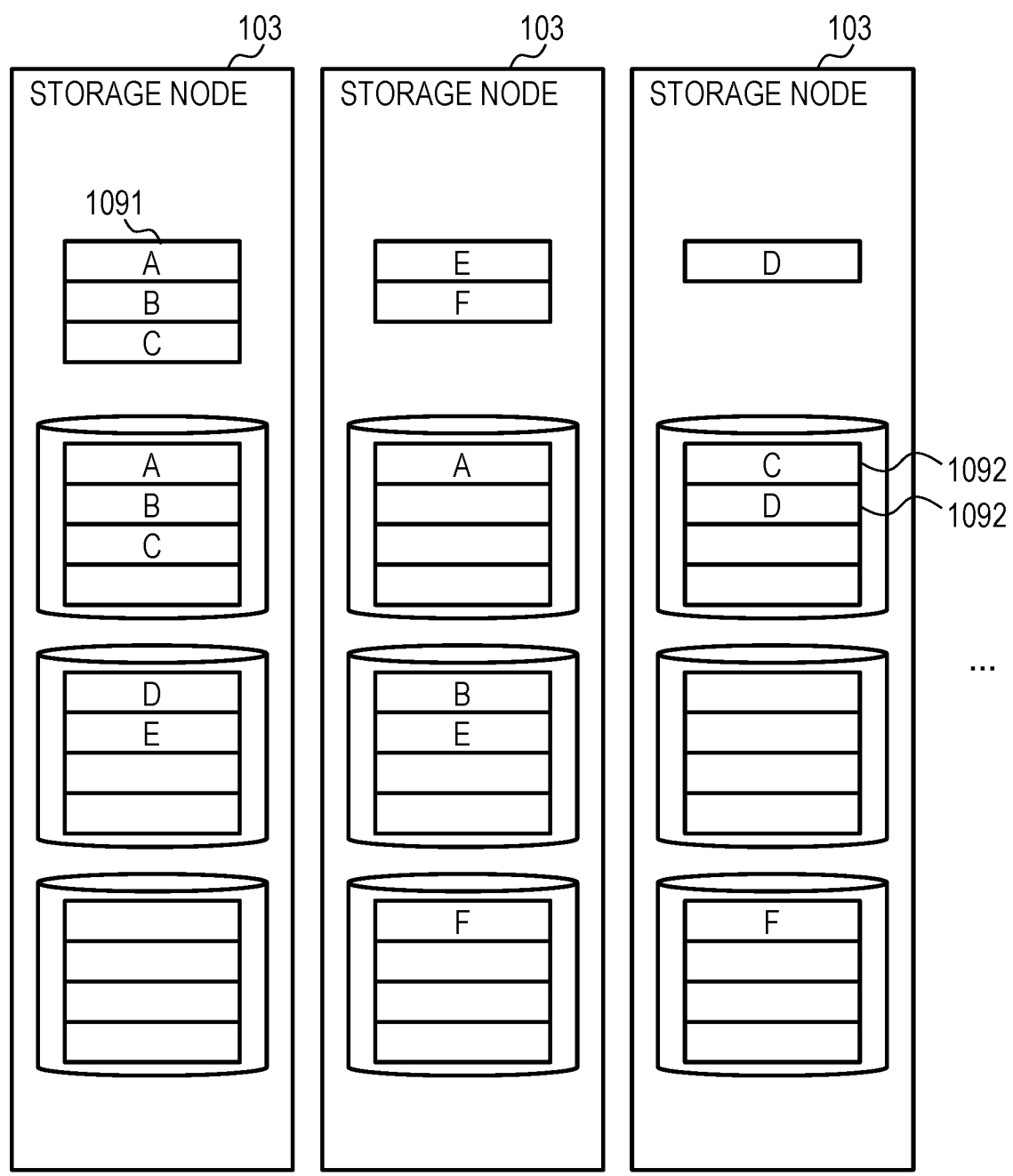
FIG. 4 illustrates examples of a program and data stored in the storage node according to the first embodiment.

In this information processing system having the above configuration, the capacity control unit 1086 manages the physical storage areas respectively provided by the storage devices 1033 in the respective storage node 103 in the state of being divided into physical storage areas (hereinafter referred to as physical chunks) having a predetermined size as illustrated in FIG. 4.

In addition, the capacity control unit 1086 associates dedicated pools respectively with the redundancy groups, appropriately allocates logical storage areas having the same size as the physical chunk (hereinafter referred to as logical chunks) to these pools, and associates one or a plurality of physical chunks with these logical chunks.

Further, one or a plurality of virtual logical volumes (hereinafter referred to as virtual volumes) are defined on the pool of each redundancy group, and these virtual volumes are provided to the host device 101.

When writing data to such a virtual volume, the host device 101 transmits a write request, which specifies an identifier (logical number unit (LUN)) of a virtual volume to which the data is written (hereinafter referred to as a write target virtual volume) and an area to which the data is written in the write target virtual volume (hereinafter, this is referred to as a write destination area), to any of the storage nodes 103 in the corresponding cluster.

The front-end driver 1081 of storage node 103 that received this write request transfers the write request and write target data (hereinafter referred to as write data), transmitted from the host device 101 together with the write request, to the active storage control unit 1083 (FIG. 3) of the redundancy group associated with the write target virtual volume specified in the received write request via the pool or the front-end driver 1081 of each of the storage nodes 103 in which the standby storage control unit 1083 is arranged.

In addition, the front-end driver 1081 of the storage node 103 having received these write request and write data pass these write request and write data to the storage control unit 1083 of the redundancy group associated with the write target virtual volume specified in the write request via the pool.

The active storage control unit 1083 of the storage control units 1083 to which these write request and write data have been passed allocates a storage area (hereinafter referred to as a logical area) to the write destination area in the write target virtual volume as necessary from the logical chunk constituting the pool associated with the write target virtual volume.

In addition, this active storage control unit 1083 generates an I/O command, obtained by converting an address of the write destination area in the write target virtual volume specified in the write request to a chunk number of the logical chunk from which the logical area has been allocated to the write destination area and an offset position of the logical area, and transmits the generated I/O command to the capacity control unit 1086 in the own storage node 103 together with the write data.

When receiving these I/O command and write data, the capacity control unit 1086 stores data in each of the storage areas at the offset position in each of the storage devices 1033 that provides each of the physical chunks associated with the logical chunk specified by the I/O command.

In this manner, the data from the host device 101 is redundantly stored in the plurality of physical chunks associated with the corresponding logical chunk in this information processing system. Therefore, the number of the physical chunks allocated to the logical chunk is determined by a setting content of a redundancy method in the information processing system.

For example, in a case of setting in which data multiplexed according to triplication or higher is stored, or a case of setting in which redundant data is created from data and stored as in Erasure-Coding, a required number of (three or more) physical chunks are associated with one logical chunk.

When a plurality of physical chunks are associated with one logical chunk and data is stored to be multiplexed in the plurality of physical chunks, one physical chunk of the plurality of physical chunks is set to a "master" and all the remaining physical chunks are set to "mirrors". Then, data read from a physical chunk is performed from the physical chunk set to the "master" as will be described later. In the case of erasure coding (EC), a plurality of physical chunks are associated with one logical chunk, and master data and redundant data are stored in the plurality of physical chunks in a predetermined pattern.

Meanwhile, when reading data from a virtual volume, the host device 101 transmits a read request, which specifies a LUN of the virtual volume (hereinafter referred to as a read target virtual volume) and a storage area as a read destination of the data in the read target virtual volume (hereinafter referred to as a read destination area), to any of the storage nodes 103 in the cluster including the read target virtual volume.

The front-end driver 1081 of the storage node 103 having received this read request transfers the read request to the active storage control unit 1083 of the redundancy group associated with the read target virtual volume specified in the received read request via the pool or the read request is each of the storage nodes 103 in which the standby storage control unit 1083 is arranged.

In addition, the front-end driver 1081 of the corresponding storage node 103 having received this read request passes this read request to the storage control unit 1083 of the redundancy group associated with the read target virtual volume specified in the read request via the pool.

Thus, the active storage control unit 1083 among the storage control units 1083 to which this read request has been passed generates an I/O command, obtained by converting an address of the read destination area in the read target virtual volume to a chunk number of a logical chunk from which a logical area has been allocated to the read destination area and an offset position of the logical area, and transmits the generated I/O command to the capacity control unit 1086 in the own storage node 103.

When receiving this I/O command, the capacity control unit 1086 reads data from a storage area at the offset position specified by the I/O command in the physical chunk set to the "master" among the respective physical chunks associated with the logical chunk specified by the I/O command, and transfers the read data as read data to the active storage control unit 1083 which is a transmission source of the I/O command. Thus, the read data is then transferred by the active storage control unit 1083 to the host device 101, which is a transmission source of the read request, via the network 102.

(1-2) Allocation of Physical Chunk to Logical Chunk

By the way, in the case of adopting the redundancy method of associating one logical chunk with a plurality of physical chunks and storing data in each of these physical chunks to make data redundant as described above, it is desirable to select the plurality of physical chunks associated with one logical chunk from physical chunks respectively provided by the different storage nodes 103 from the viewpoint of data protection. This is because data lost occurs when it is difficult for the storage node 103 to read data due to a failure or the like, for example, when a plurality of physical chunks in the same storage node 103 are associated with one logical chunk.

Therefore, in this information processing system, when the capacity control unit 1086 allocates a logical chunk to the redundancy group and associates a plurality of physical chunks with the logical chunk, these plurality of physical chunks are selected from physical chunks provided by the plurality of storage nodes 103 which are different from each other.

Meanwhile, in a case where a physical chunk associated with a logical chunk is selected from physical chunks in the storage node 103 different from the storage node 103 in which the active storage control unit 1083 is arranged, communication with the storage node 103 that provides the physical chunk is required when the capacity control unit 1086 (the capacity control unit 1086 in the same storage node 103 as active storage control unit 1083) having received an I/O command from the active storage control unit 1083 reads/writes data from/to the physical chunk, which causes a problem that the response performance of the entire system deteriorates. Therefore, at the time of associating the plurality of physical chunks with the logical chunk, it is desirable to select one of the physical chunks from physical chunks provided by the storage device 1033 in the storage node 103 in which the active storage control unit 1083 is arranged from the viewpoint of the response performance of the entire system.

In addition, considering that the standby storage control unit 1083 is switched to the active mode when a failure occurs in the storage node 103 in which the active storage control unit 1083 is arranged in the redundancy group, it is desirable to select one of the physical chunks associated with the logical chunk from physical chunks provided by the storage device 1033 in the storage node 103 in which the standby storage control unit 1083 is arranged for the same reason as described above, from the viewpoint of the response performance of the entire system.

Therefore, in this information processing system, the capacity control unit 1086 is equipped with a capacity preferential allocation function in which the physical chunk provided by the storage device 1033 in the storage node 103 in which the active storage control unit 1083 of the redundancy group is arranged and the physical chunk provided by the storage device 1033 in the storage node 103 in which the standby storage control unit 1083 of the redundancy group is arranged are preferentially associated with the logical chunk when the capacity control unit 1086 allocates the logical chunk to the redundancy group and associates the plurality of physical chunks with the logical chunk.

However, if a logical chunk in a pool allocated to one redundancy group is associated unlimitedly with the physical chunks from the storage nodes 103 in which the active storage control unit 1083 or the standby storage control unit 1083 constituting the redundancy group are arranged, there occurs a problem that it is difficult to associate a physical chunk from the storage device 1033 in the storage node 103 with a logical chunk of another redundancy group where the active storage control unit 1083 or the standby storage control unit 1083 is arranged in the storage node 103.

Therefore, such a capacity preferential allocation function also includes a function of suppressing the capacity of the physical chunk which is allocated to a redundancy group from the storage node 103 in which the active storage control unit 1083 of the redundancy group is arranged, or the storage node 103 in which the standby storage control unit 1083 of the redundancy group is arranged.

Next, a method for arranging the storage control unit 1083 and a failover destination standby selection method in the present embodiment will be described.

Hereinafter, a storage control unit is expressed as "SC", an SC belonging to a redundancy group α (for example, α=X, Y, and so on) is expressed as "SC-α" (a is a code or number of an arbitrary redundancy group), an active SC is expressed as "SC (A)", a standby SC is expressed as "SC (S)", and SC (S) operating in a standby (i) mode is expressed as "SC (Si)". In each redundancy group, "i" is a serial number (hereinafter, standby number) assigned to an SC (S), which corresponds to a priority of a failover destination. In the present embodiment, there are two SCs (S), and thus, there are SC (S1) and SC (S2) for each redundancy group. For each redundancy group, if SC (S1) and SC (S2) exist on two normal storage nodes, SC (S1) is SC (S) with the highest priority, that is, SC (S) of the failover destination. For each redundancy group, when no failure occurs in a storage node with SC (S2) but a failure occurs in a storage node with SC (S1) (that is, when SC (S1) is not the failover destination), SC (S2) is SC (S) with the highest priority. In this manner, the standby number of SC (S) corresponds to an example of the priority with which the SC (S) becomes the failover destination, for each redundancy group.

Figure 5:
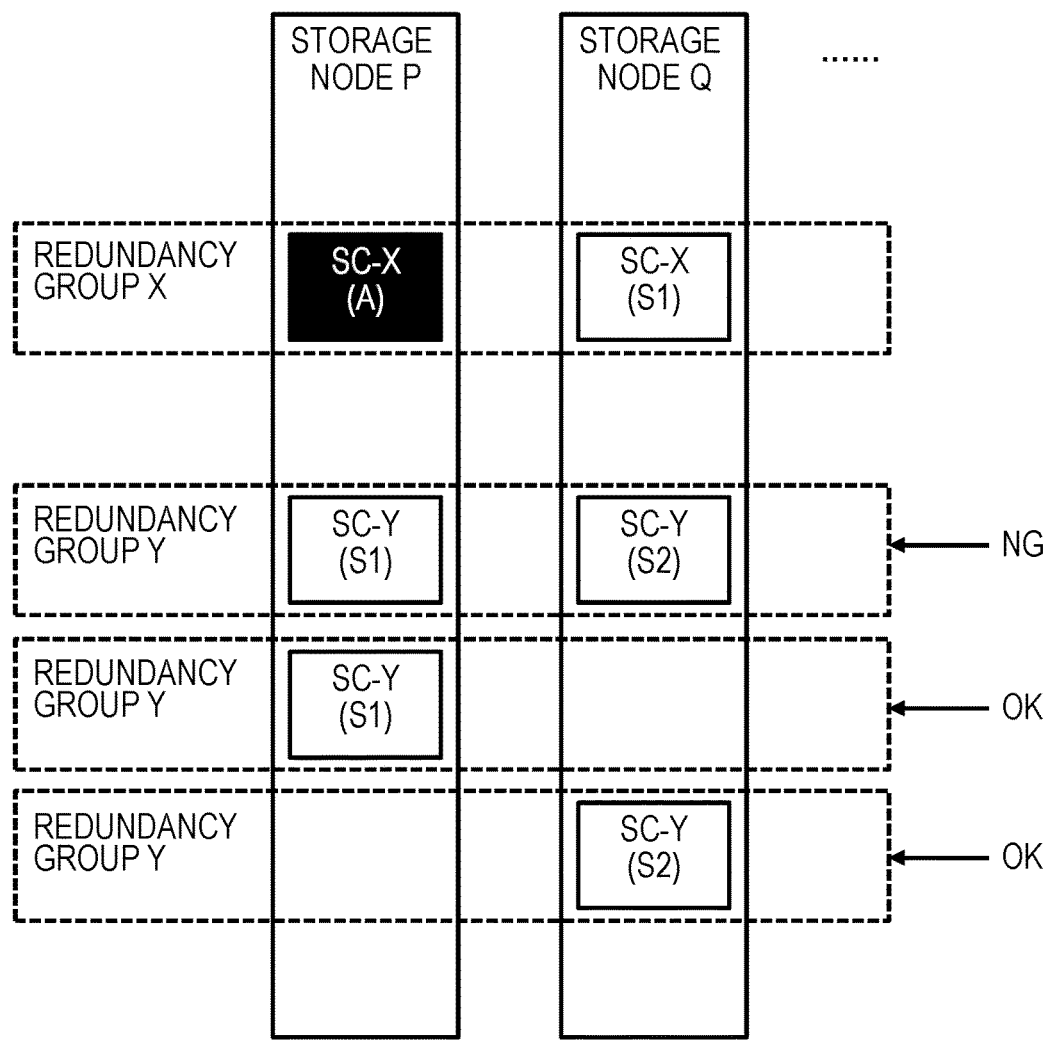
FIG. 5 illustrates an example of a method for arranging of a storage control unit according to the first embodiment.

FIG. 5 illustrates an SC arrangement method in the present embodiment.

According to the arrangement method in the present embodiment, when SC-X (A) and SC-Y (S1) are arranged in a storage node P, SC-Y (S2) is arranged in the storage node 130 other than a storage node Q in which SC-X (S1) is arranged.

According to the failover destination standby selection method in the present embodiment, an SC (S) with the youngest standby number among operating SCs (S) (that is, SCs existing on the normal storage nodes) is selected as the failover destination in each redundancy group.

By adopting such arrangement method and failover destination standby selection method, it is possible to maintain a state where three or more SCs (A) do not operate on the same storage node 130 without migrating the SC previously and/or afterwards no matter what order the two storage nodes 130 fail.

Figure 6:
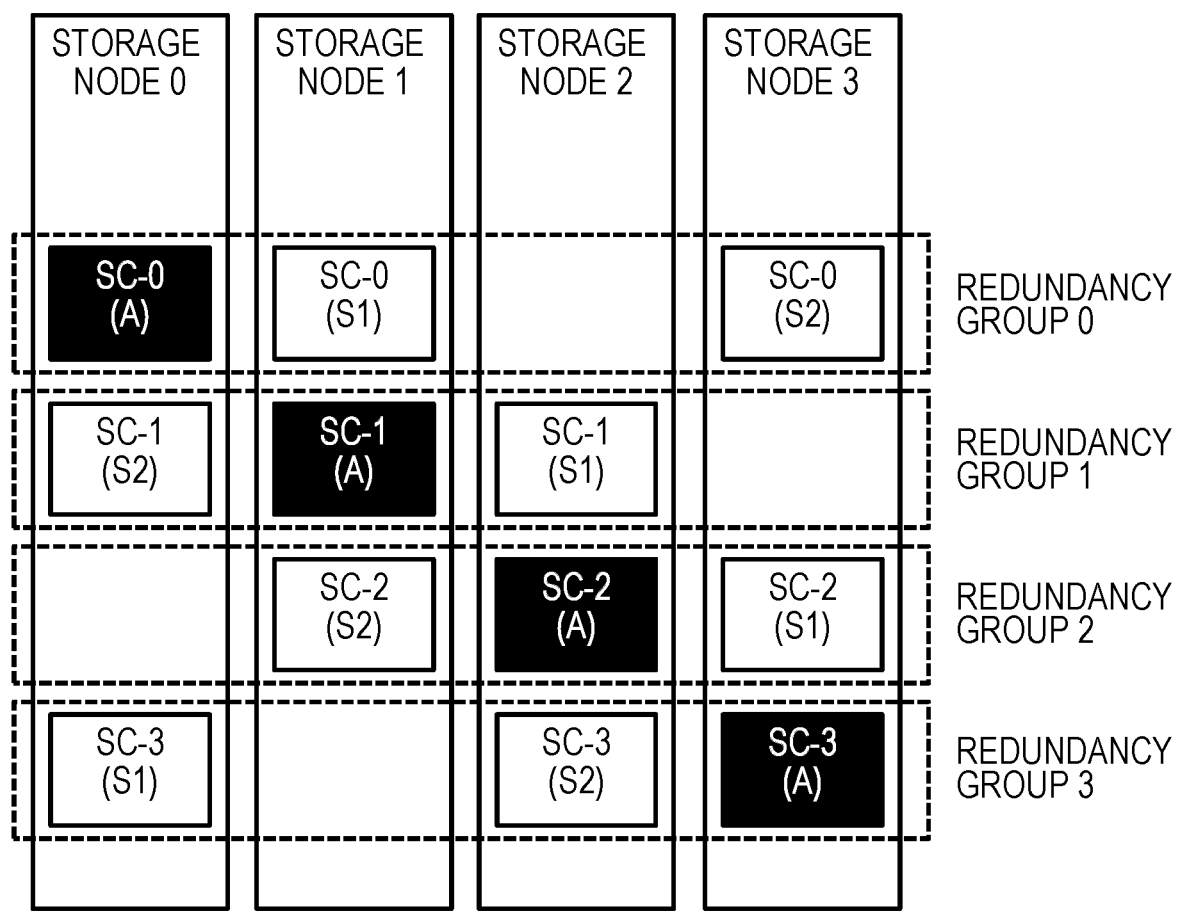
FIG. 6 illustrates an example of arrangement of the storage control unit according to the first embodiment.

FIG. 6 illustrates an example of SC arrangement. In the following description, mod is a symbol that obtains the remainder of division. In addition, it is assumed that a node number h (h is an integer and a serial number (0, 1, and so on)) is assigned to the storage node 130 as an identification number. In addition, it is assumed that a group number n (n is an integer and a serial number (0, 1, and so on)) is assigned to the redundancy group as an identification number. The configuration information 51 includes information indicating the number of storage nodes (or the node number h of each storage node), the number of redundancy groups (or the group number n of each redundancy group), and the number of SCs (S) in each redundancy group (in the present embodiment, the number of SCs (S) is two).

The arrangement control unit 53 arranges an SC-n (A) in a storage node with the node number n (h=n) based on the configuration information 51. Next, the arrangement control unit 53 arranges an SC-n (S1) on a storage node with a node number ((n+1) mod 4) based on the configuration information 51, and arranges an SC-n (S2) on a storage node with a node number ((n−1) mod 4). As a result, the SC arrangement illustrated in FIG. 6 is realized. In this paragraph, "4" in "mod 4" is an example of the number of storage nodes.

FIGS. 7 to 10 illustrate a failure pattern of two nodes in the arrangement example illustrated in FIG. 6. It is illustrated that it is possible to maintain the state where three or more SCs (A) do not operate on one storage node without migrating SC previously or afterwards no matter what order two nodes fail.

Figure 7:
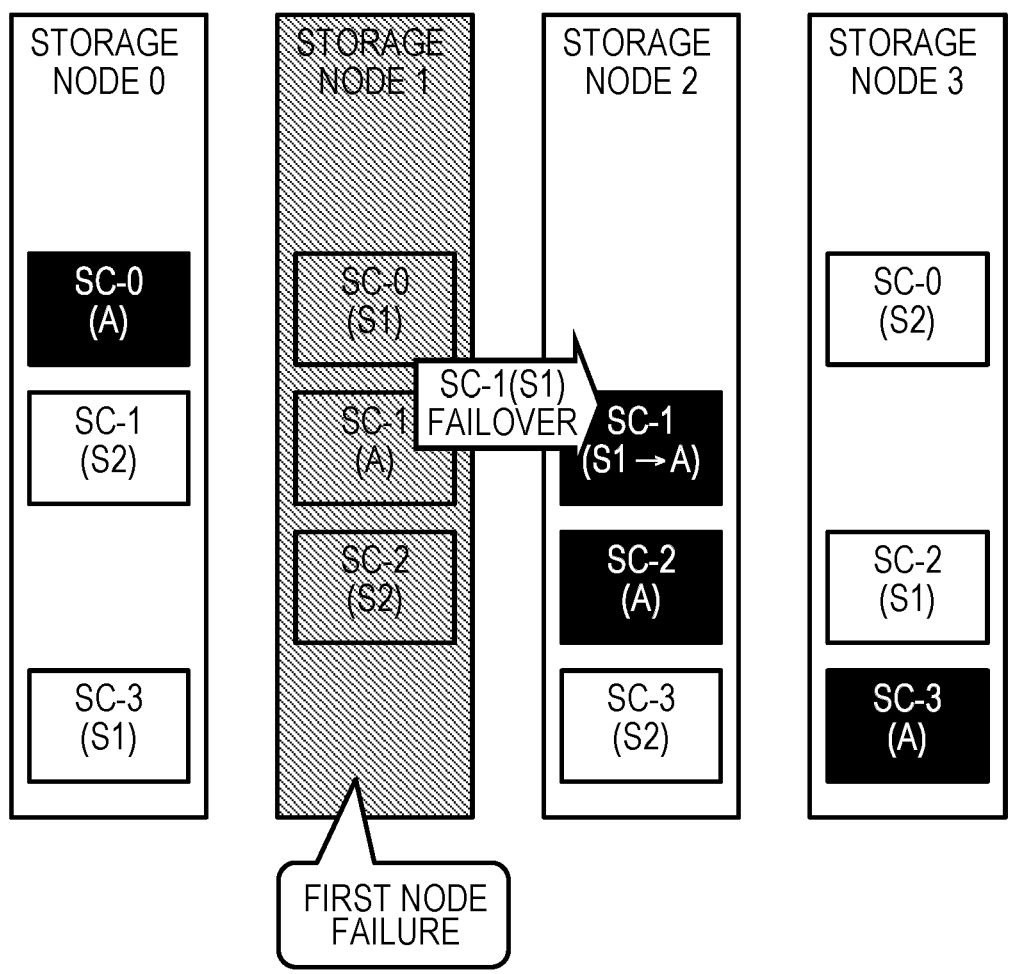
FIG. 7 illustrates a case where the first storage node that has failed is Storage Node 1.

FIG. 7 illustrates a case where the first storage node that has failed is Storage Node 1. Regarding an SC-1 (A), failover from the SC-1 (A) to an SC-1 (S1) to which a younger standby number is assigned between the remaining two SC-1 (S1) and SC-1 (S2) due to the failure of Storage Node 1 (to change a state of an SC (Si) from the standby mode to the active mode to take over the processing of an SC (A) belonging to the same redundancy group can be expressed as "to perform failover to the SC (Si)"). At this point, SC2 (A), which has been originally operating, and SC-1 (A) whose mode has been newly switched operate on Storage Node 2.

Figure 8:
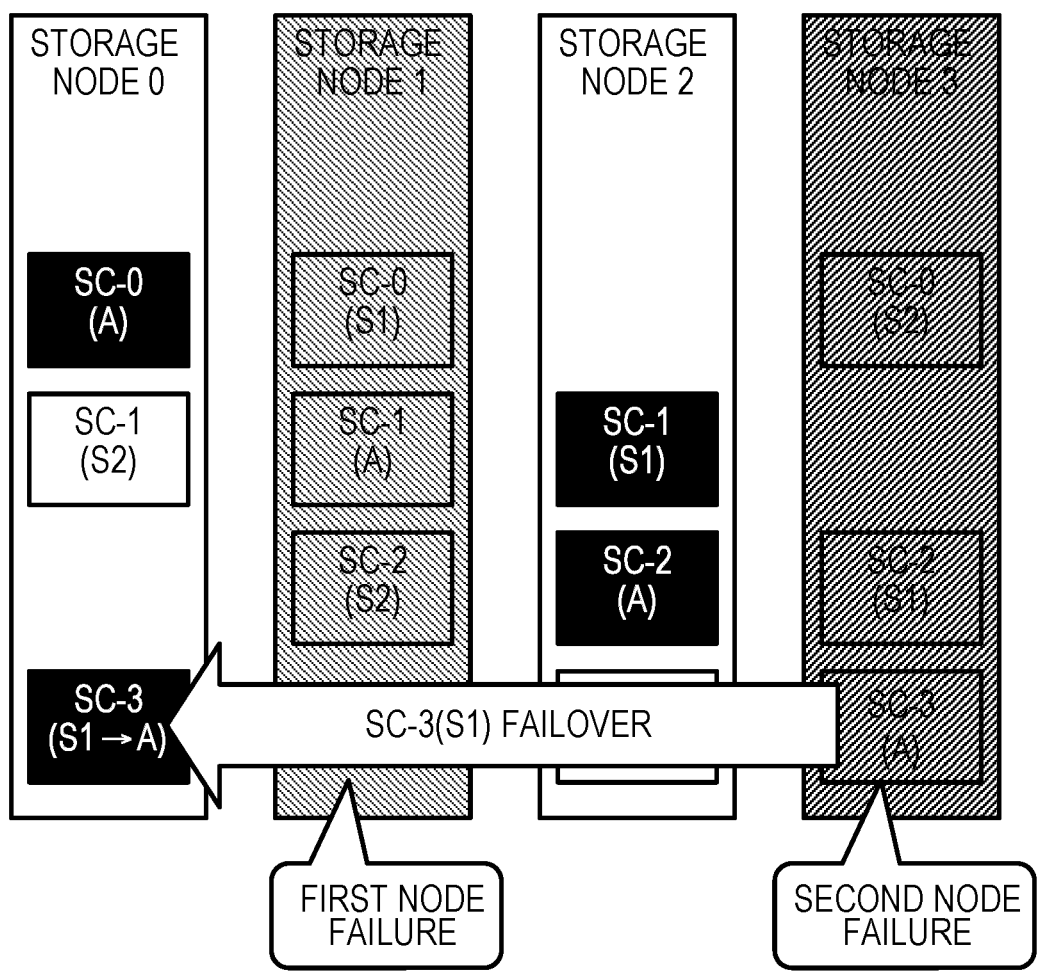
FIG. 8 illustrates a case where the second storage node that has failed is Storage Node 3.
Figure 9:
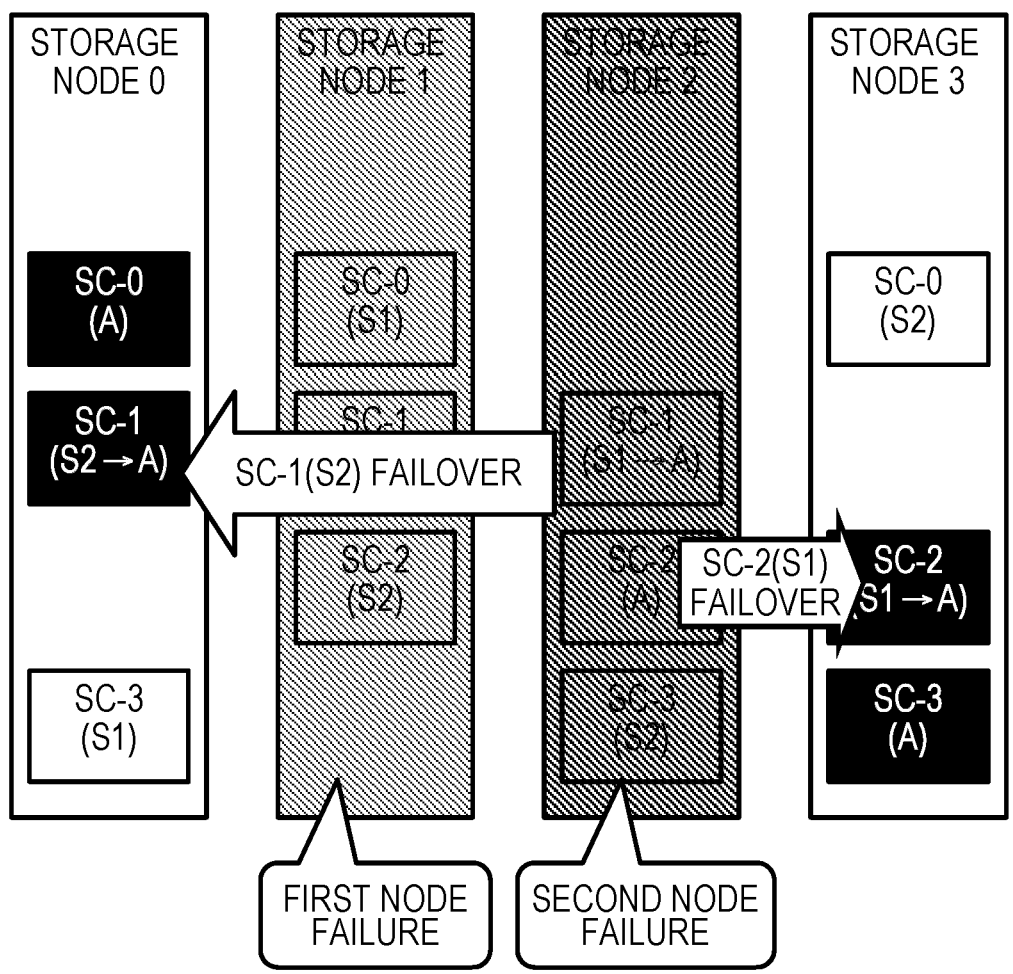
FIG. 9 illustrates a case where the second storage node that has failed is Storage Node 2.
Figure 10:
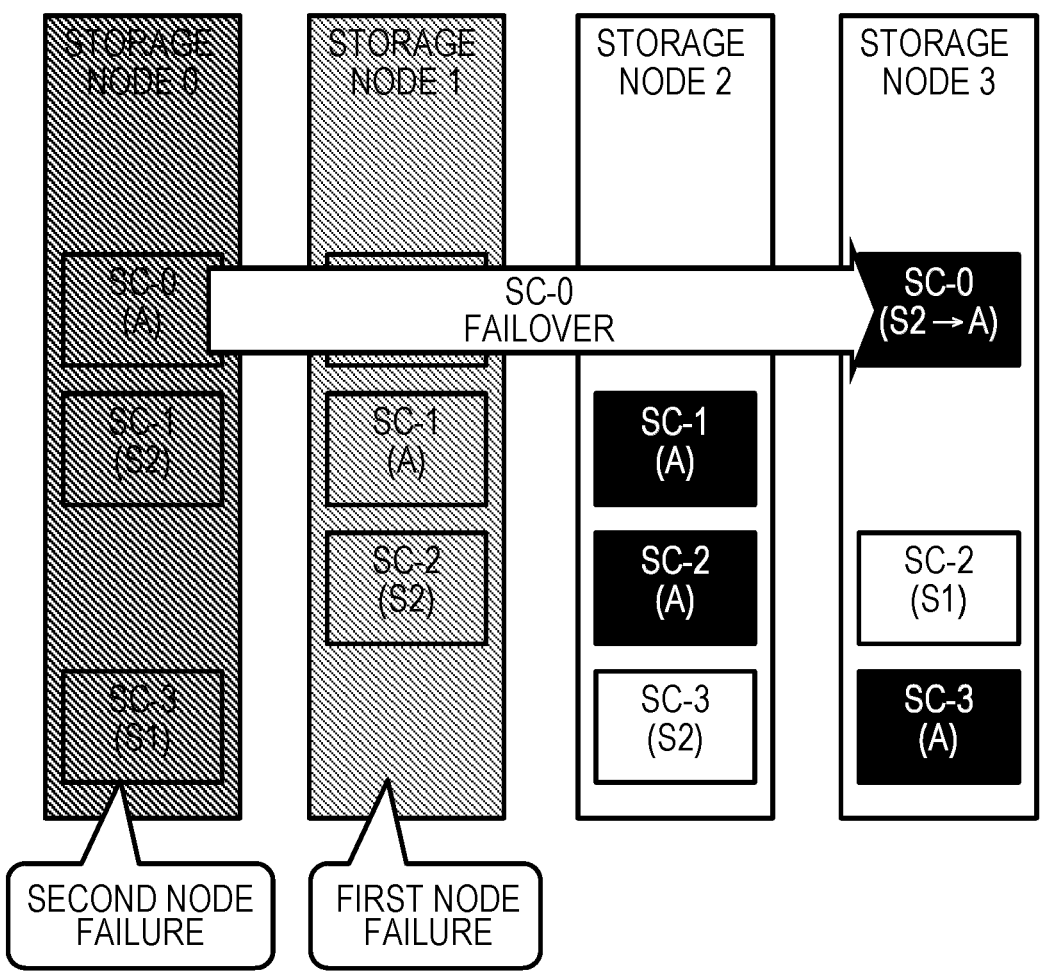
FIG. 10 illustrates a case where the second storage node that has failed is Storage Node 0.

FIGS. 8 to 10 illustrate cases where the second storage node that has failed is Storage Node 0, 2 or 3. In either case, failover in which processing is taken over to the SC (S) with the youngest standby number among the operating SCs (S) is performed, but the number of SCs (A) operating on each storage node is two at maximum. In this paragraph, "two" in "two at maximum" is an example of the upper limit of SCs (A) allowed to exist in one storage node.

Figure 11:
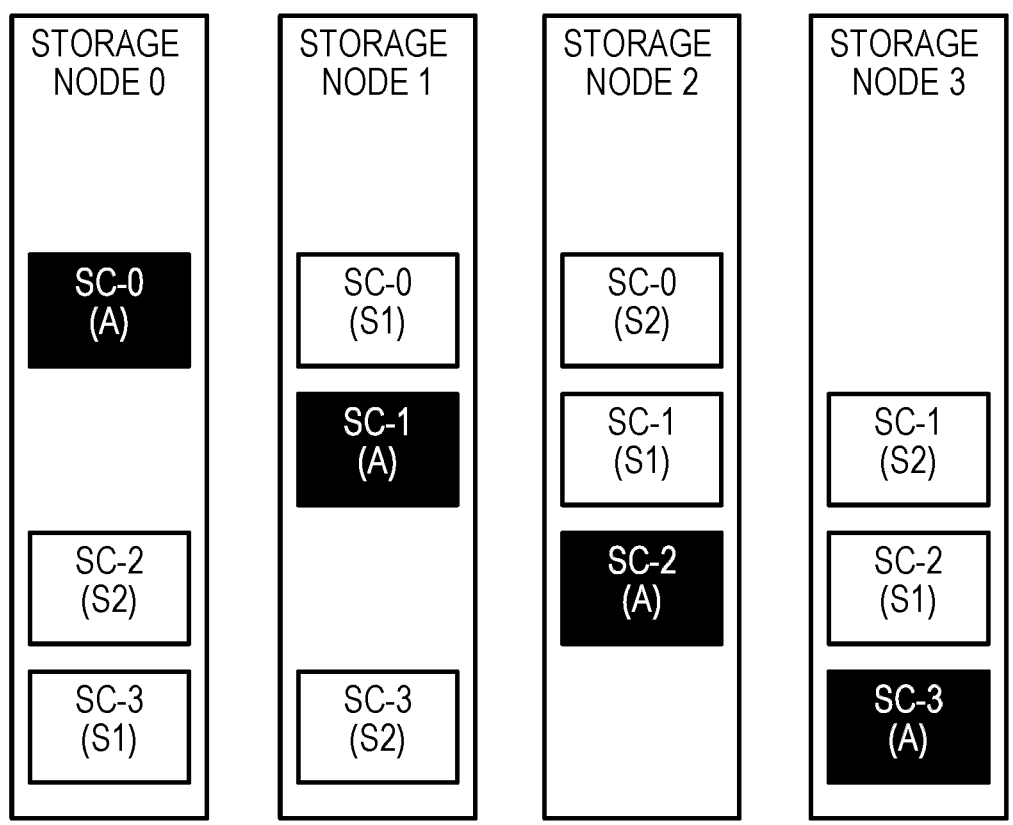
FIG. 11 illustrates a comparative example of the first embodiment.

FIG. 11 illustrates a comparative example of the present embodiment.

In this comparative example, an SC-n (A) is arranged in a storage node n (h=n), and an SC-n (S1) is arranged in a storage node with a node number ((n+1) mod 4), which is the same as the example illustrated in FIG. 6.

However, an SC-n (S2) is arranged in a storage node with a node number ((n+2) mod 4). That is, in this comparative example, an SC-0 (A) and an SC-3 (S1) are arranged in the same Storage Node 0, and an SC-0 (S1) and an SC-3 (S2) are arranged in the same Storage Node 1. From another viewpoint, there are a plurality of SC pairs in which a node pair of a failover source storage node and a failover destination storage node is the same and redundancy groups are different from each other. The "SC pair" is a pair of the failover source SC and the failover destination SC, and specifically corresponds to a pair of SC (A) and SC (S1), and a pair of SC (Si) and SC (S(i+1)). According to the example of FIG. 12, a pair of SC-1 (A) and SC-1 (S1) in Redundancy Group 1 and a pair of SC-0 (S1) and SC-0 (S2) in Redundancy Group 0 correspond to the SC pair in which redundancy groups are different and the node pair is the same (in either case, the node pair is formed of Storage Node 1 as the failover source and Storage Node 2 as the failover destination).

Figure 12:
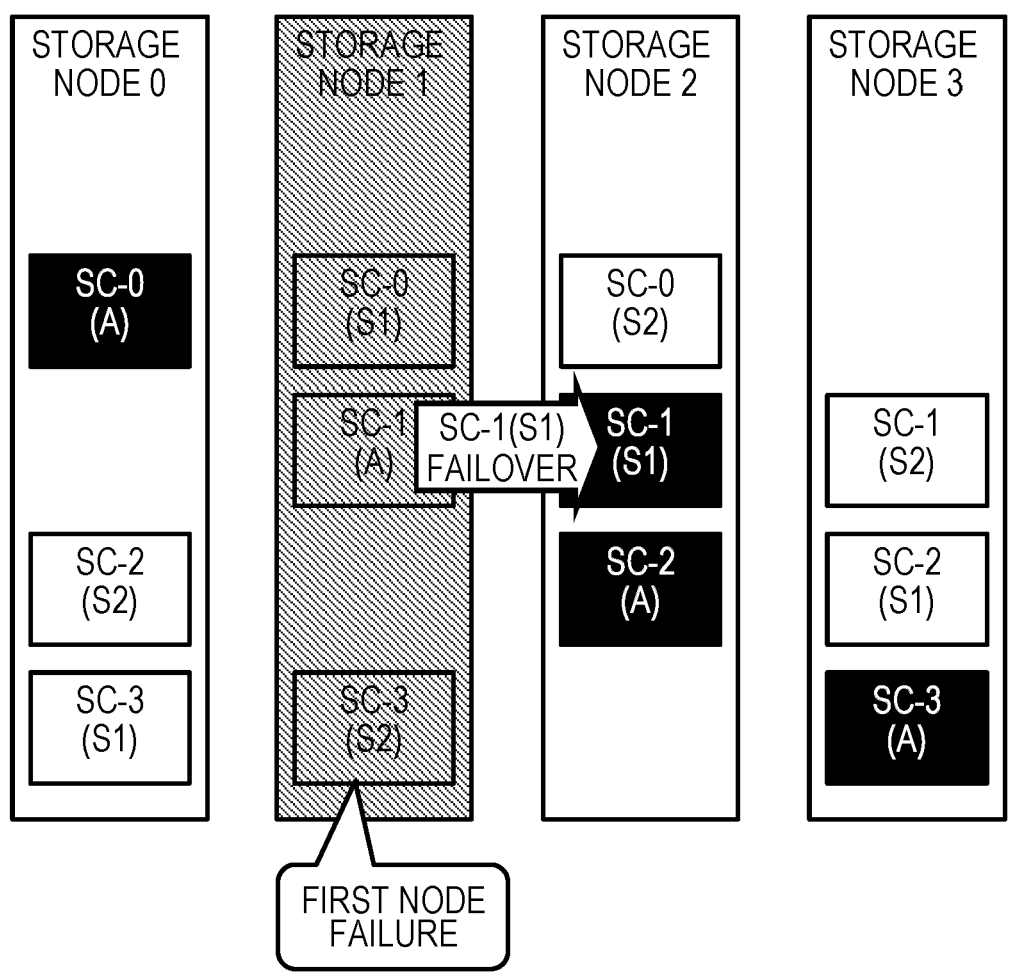
FIG. 12 illustrates a comparative example of the first embodiment.
Figure 13:
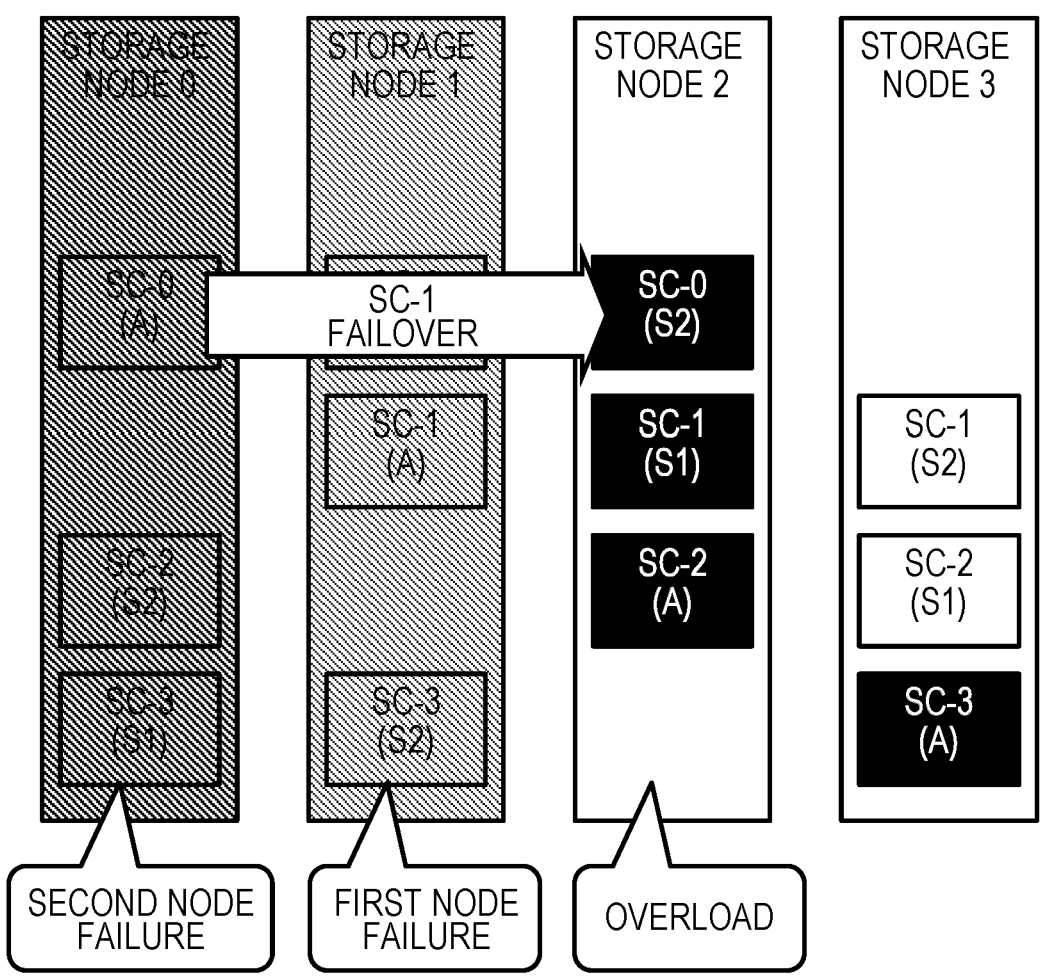
FIG. 13 illustrates a comparative example of the first embodiment.

Therefore, there is a case where three SCs (A) operate on the same storage node when the second storage node fails in this comparative example. FIGS. 12 and 13 illustrate examples of such a case. That is, if Storage Node 1 fails first (FIG. 12), and then, Storage Node 0 fails (FIG. 13), three SCs (A) operate on Storage Node 2. Specifically, when a failure occurs in Storage Node 1, failover from the SC-1 (A) to the SC-1 (S1) is performed, so that the SC-1 (S1) becomes the SC-1 (A) in Storage Node 2. As a result, there are two SCs (A) in Storage Node 2. Thereafter, when Storage Node 0 fails, failover from the SC-0 (A) to the SC-0 (S2) is performed since the SC-0 (S1) exists in the failing node 1, and the SC-0 (S2) becomes the SC-0 (A) in Storage Node 2. As a result, there are three SCs (A) in Storage Node 2. Therefore, unless the SC (A) is migrated after the failure occurs in the first Storage Node 1 or after the failure occurs in the second Storage Node 0, it is difficult to avoid the problem that the three SCs (A) operate on one Storage Node 2 (that is, an overload that consumes a large amount of resources such as the memory capacity occurs).

Figure 14:
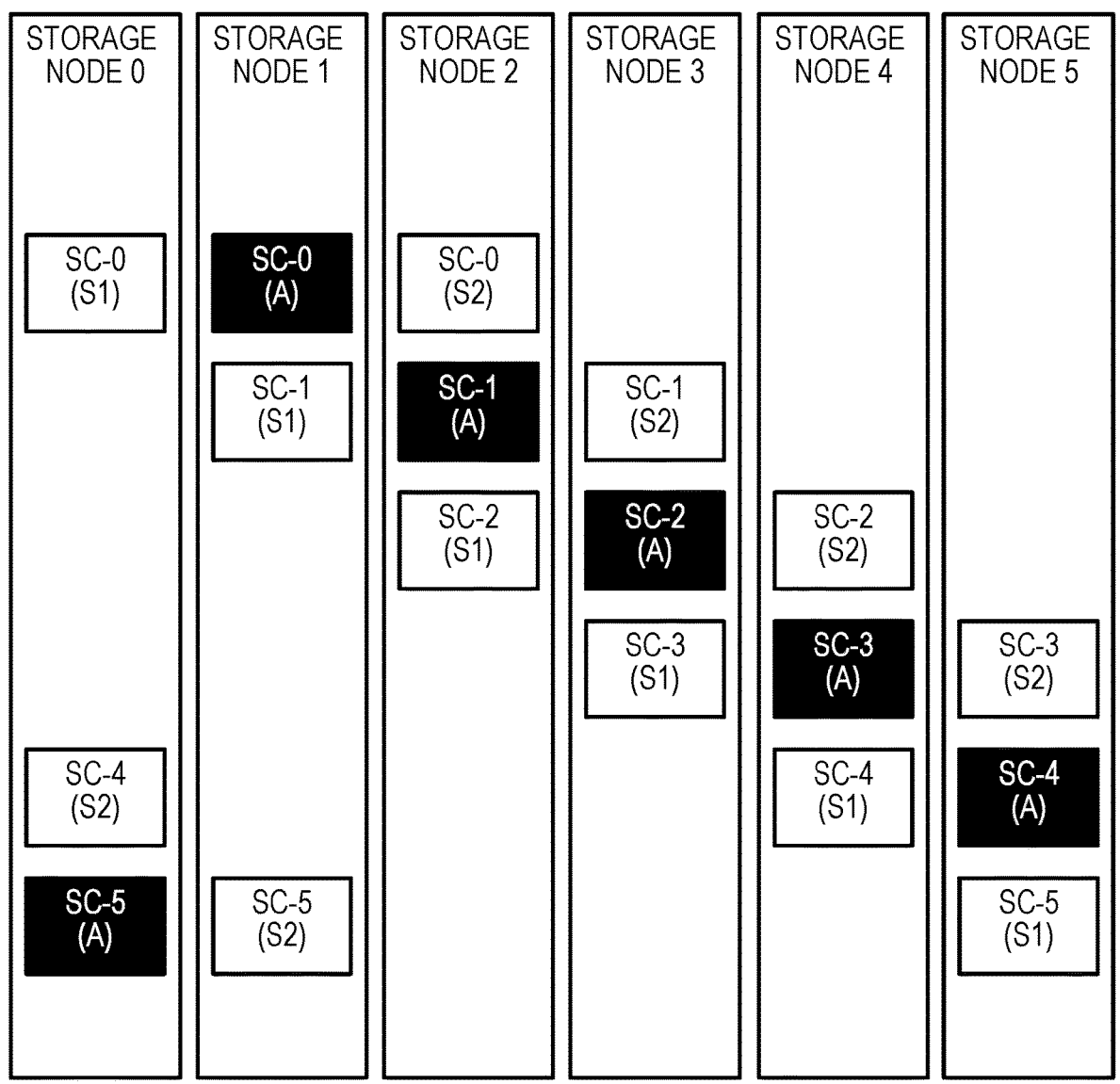
FIG. 14 illustrates an example of arrangement of the storage control unit according to the first embodiment.

On the other hand, the SC arrangement method of the present embodiment described with reference to FIGS. 6 to 10 is advantageous for any number of storage nodes in which the number of storage nodes is four or more. FIG. 14 illustrates an example of SC arrangement when the number of nodes is six. In this example, an SC-n (A) is first arranged in a storage node n (h=n). In addition, an SC-n (S1) is arranged in a storage node with a node number ((n+1) mod 6), and an SC-n (S2) is arranged in a storage node with a node number ((n−1) mod 6).

From another viewpoint, SCs that can take over a plurality of SCs arranged in a node are arranged in different nodes, respectively. For example, in a plurality of SC pairs in which redundancy groups are different and failover source SCs are arranged in the same node, nodes in which failover destination SCs are arranged are different. When FIGS. 6 to 10 are taken as examples, in the pair of SC-1 (A) and SC-1 (S1) and the pair of SC-0 (S1) and SC-0 (S2), all the failover source SCs are arranged in Storage Node 1, but the failover destination SCs are arranged in Storage Nodes 2 and 3, respectively. The examples of the SC arrangement illustrated in FIGS. 6 to 10 and 14 are expressed more generally as follows, for example. Hereinafter, C is the number of storage nodes.

An SC-n (A) is arranged in a storage node n (h=n).

An SC-n (S1) is arranged in a storage node with a node number ((n+$X_1$) mod C), and an SC-n (S2) is arranged in a storage node with a node number ((n+$X_2$) mod C).

In the above examples, $X_1$=1 and $X_2$=−1.

Figure 15:
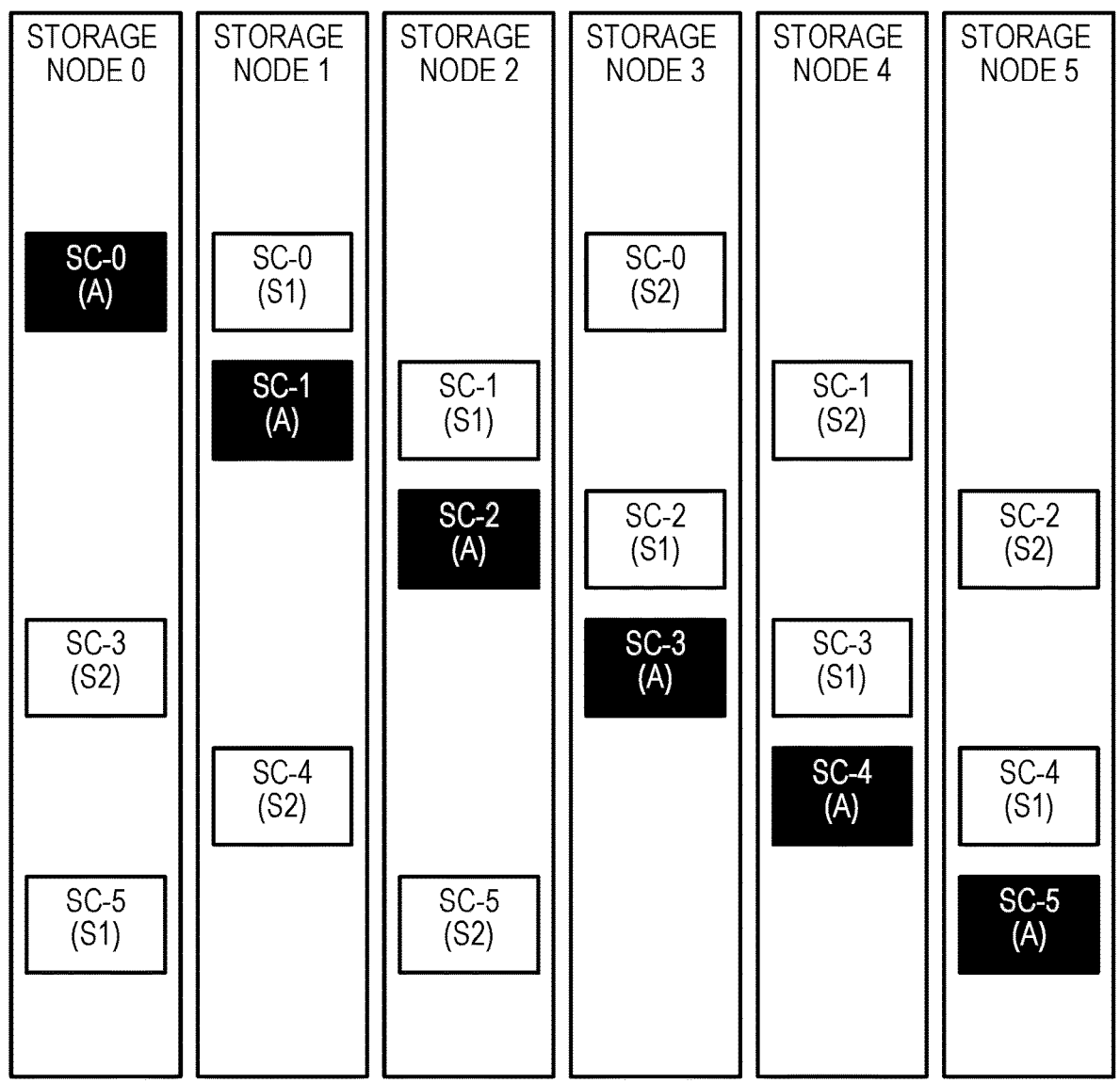
FIG. 15 illustrates an example of a method for arranging of the storage control unit according to the first embodiment.
Figure 16:
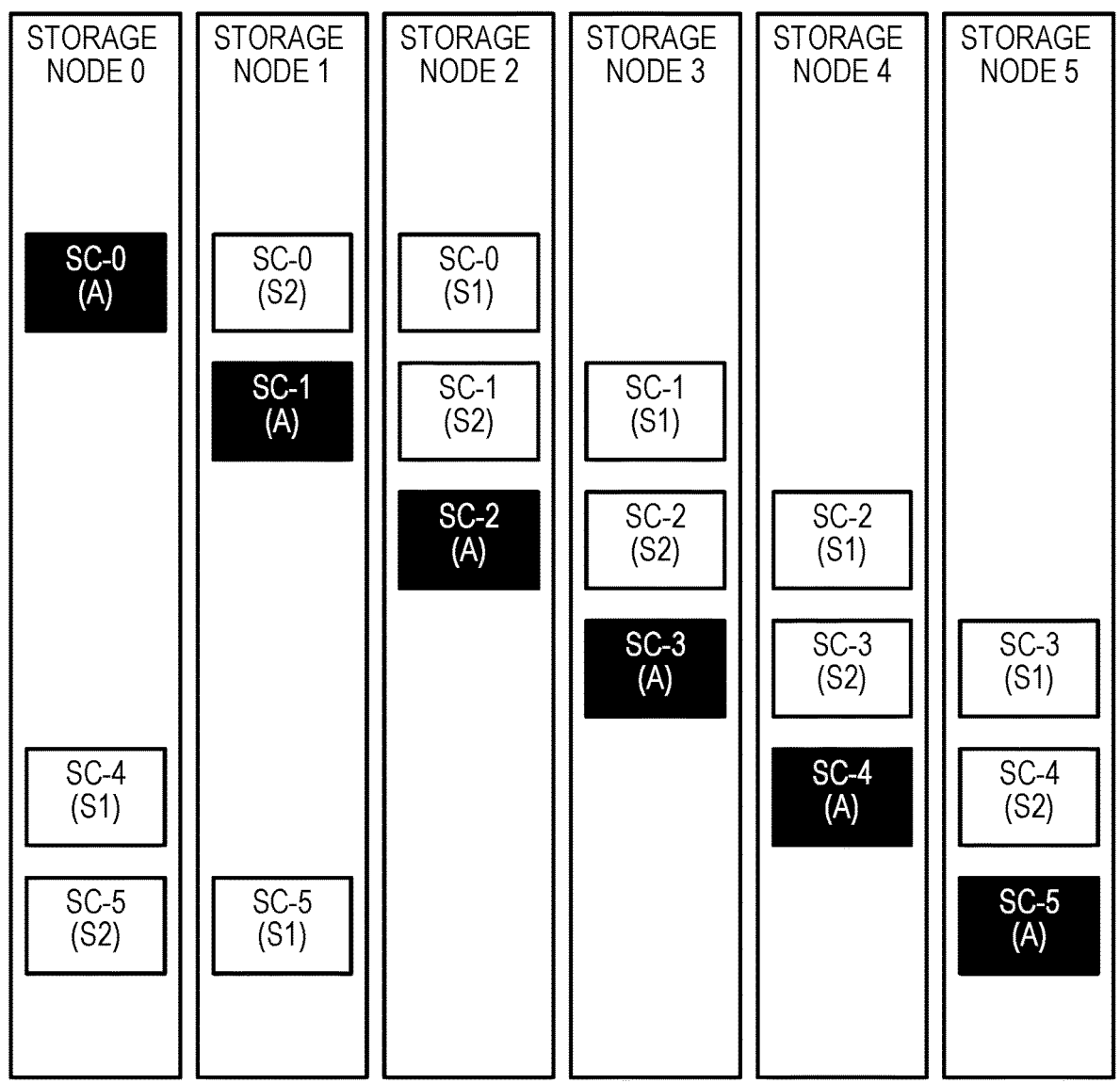
FIG. 16 illustrates an example of arrangement of the storage control unit according to the first embodiment.

Examples of the SC arrangement method according to the present embodiment are not limited to the above-described examples. For example, FIG. 15 illustrates an example where $X_1$=1 and $X_2$=3, and FIG. 16 illustrates an example where $X_1$=2 and $X_2$=1. In either case, the arrangement condition described with reference to FIG. 5 is satisfied in a case where the number of storage nodes C is four or more.

An example of an effect of the SC arrangement method according to the present embodiment will be described with reference to FIG. 5. First, when the first node failure occurs in the node P, failover is performed from an SC-X (A) existing in the node P to an SC-X (S1) existing in the node Q. Therefore, there are two SCs (A) in the node Q. In this state, it is difficult to perform failover to an SC (S) existing in either the node P or the node Q among all the nodes in this information processing system. This is because the node P has failed and the number of SCs (A) existing in the node Q has reached the upper limit (allowable number) "two" (in this example, the upper limit of the number of SCs (A) is "(K−1)" (K is the number of SCs arranged in one storage node). It is possible to perform the failover to the SC (S) in nodes other than Nodes P and Q. Therefore, it suffices that at least one SC (S) is provided in the storage nodes other than the storage nodes P and Q, for each redundancy group.

According to the SC arrangement method of the present embodiment, an SC-Y (S) is arranged in the storage nodes other than the storage nodes P and Q in Redundancy Group Y, which is each redundancy group other than Redundancy Group X in which the SC (A) exists in the storage node P in which the first node failure has occurred, and thus, a state where it is possible to perform failover to the SC-Y standby that remains after the first failure is maintained.

(2) Second Embodiment

A second embodiment will be described. A difference from the first embodiment will be mainly described, and common points with the first embodiment will be omitted or simplified.

In the present embodiment, each redundancy group is constituted by quadruple SCs. That is, the redundancy group is constituted by one SC (A) and three SCs (S) in the present embodiment.

Figure 17:
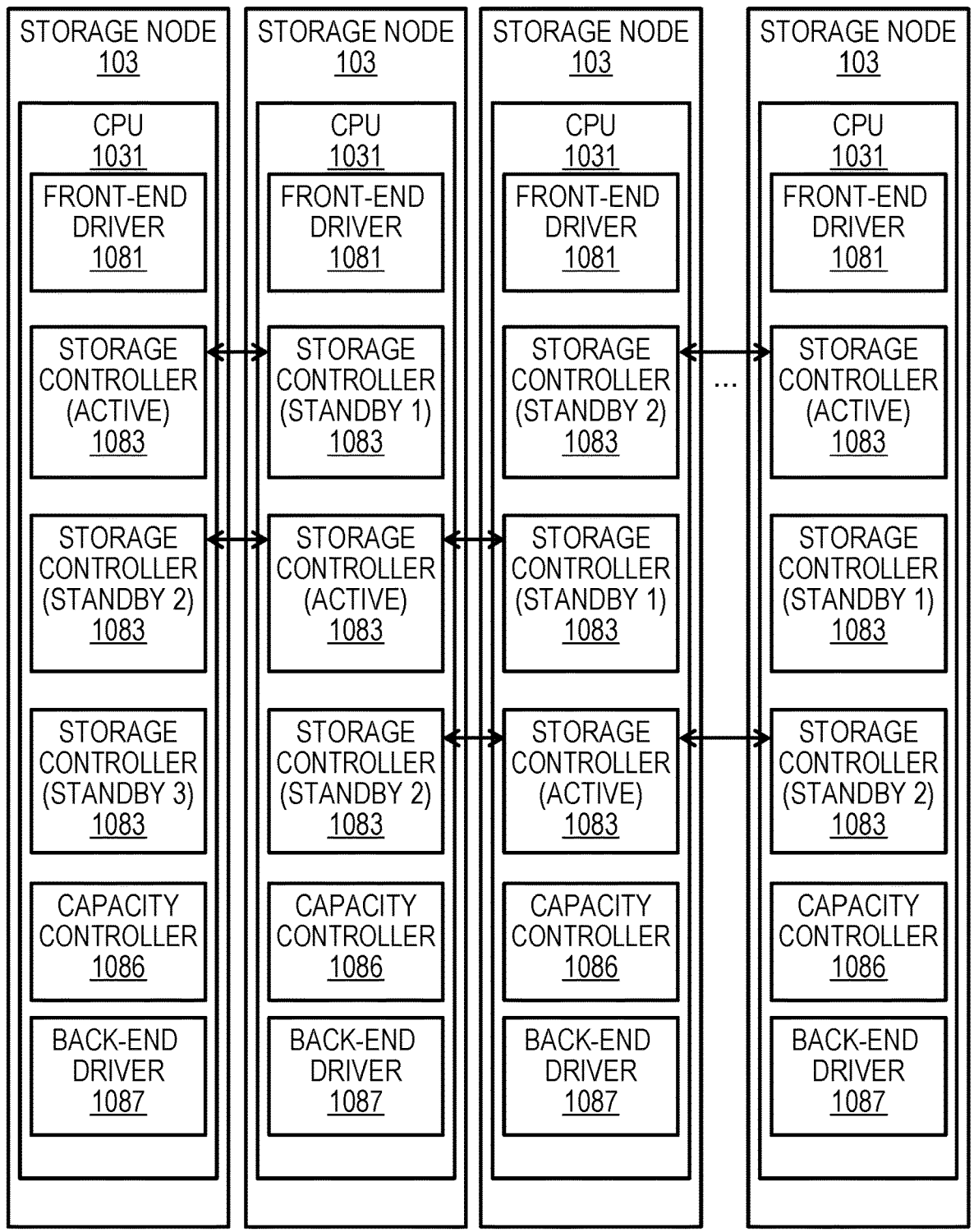
FIG. 17 illustrates a logical configuration example of a storage node according to a second embodiment.

FIG. 17 illustrates a logical configuration example of the storage node 103 according to the second embodiment. A difference from FIG. 3 is that the redundancy group is constituted by four SCs. There are four SCs on each node.

Here, the following concept of "influential node" is defined for each SC. Hereinafter, N is the number of SCs (S). In the present embodiment, N=3. Hereinafter, m is a standby number, a or β=X, Y, Z, and so on.

A storage node where an SC-α (A) is arranged is a zeroth-order influential node of SC-α.

A storage node where an SC-α (Sm) is arranged is an m-th order influential node of SC-α.

When the storage node P is the m-th order influential node of SC-α (however, m<N), a storage node in which an SC-β (Sk) (where 1≤k≤(N−m)) where SC (A) exists in the storage node P is arranged is an (m+k)-th order influential node of SC-α.

In an SC arrangement method according to the present embodiment, k pieces of SC-α (S) in the redundancy group α, at most k standby SCs are arranged in k-th order or lower influential nodes for the entire redundancy groups β for the redundancy group α, for each redundancy group.

Figure 18:
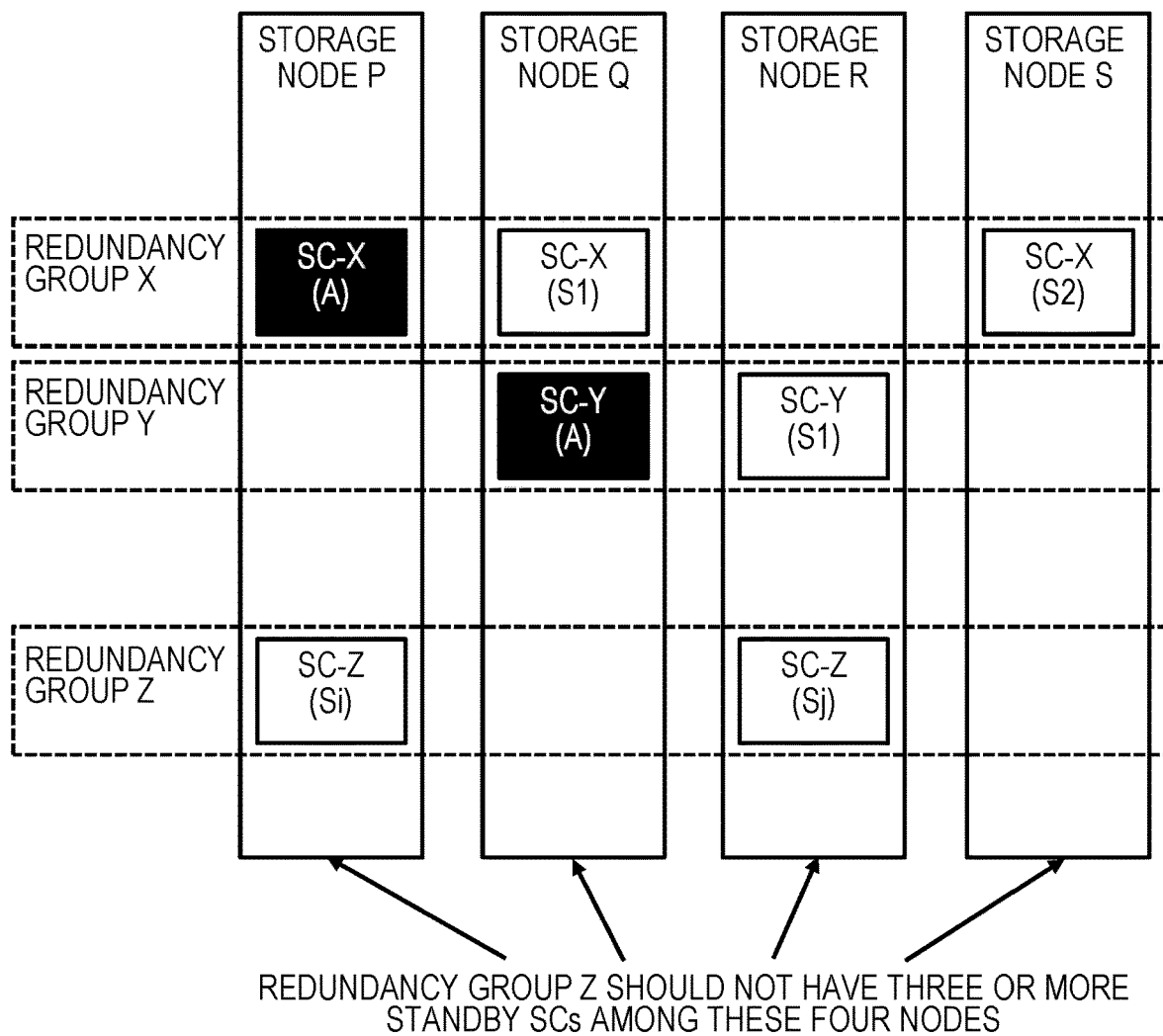
FIG. 18 illustrates a concept of an influential node and an example of a method for arranging a storage control unit according to the second embodiment.

FIG. 18 illustrates the concept of the influential node in the present embodiment and an example of the SC arrangement method.

There are four influential nodes of SC-X. That is, the node P where an SC-X (A) is arranged is a zeroth-order influential node of SC-X. The node Q where an SC-X (S1) is arranged is a primary influential node of SC-X. A node R where an SC-Y (S) (for example, an SC-Y (S1)) of Redundancy Group Y (redundancy group where an SC (A) is arranged in the primary influential node Q of SC-X) is arranged is a secondary influential node of SC-X. A node S where an SC-X (S2) is arranged is also the secondary influential node of SC-X. According to the SC arrangement method of the present embodiment, for the entire SC-Z, the SC-Z (S) between zero and two are arranged in the above-described four Influential Nodes P, Q, R and S of SC-X.

An example of an effect of the present embodiment will be described. The primary influential node of SC-X is a node that is likely to have two or more SCs (A) if the zeroth-order influential node of SC-X (that is, the node where the SC-X (A) is arranged) fails. The secondary influential node of SC-X is a node that is likely to have two or more SCs (A) if the primary influential node of SC-X fails. In general terms, a k-th order influential node of SC-X is a node that is likely to have two or more SCs (A) due to the failure in the (k−1)-order influential node of SC-X.

Next, a concept of a failure root node is defined. If a node failure occurs in the first storage node, this failing node is set as a primary failure root node. If the storage node P where a node failure occurs is a k-th order or lower influential node of a k-th order failure root node Q that already exists, the node P does not become a failure root node. Instead, the order of the k-th failure root node Q is raised to be changed to a (k+1)-th failure root node. When a node fails, this node is set as a primary failure root node if the node is not an influential node of any failure root node.

Each failure root node and an s-th order or lower influential node when the order of the failure root node is s are likely to be failing nodes or nodes with two SCs (A), and are likely to be incapable of failover.

After the t-th node failure in the information processing system, there are a plurality of failure root nodes in the system, and the sum of the orders of these failure root nodes is t. Here, when the order of each failure root node is s, the number of SCs (S) arranged in s-th order or lower influential nodes of the failure root nodes is s for all SCs. Accordingly, there are t SCs (S) in the total system. Accordingly, for all the SCs, the number of SCs (S), which are arranged in the influential nodes of the failure root nodes and are incapable of failover, is t. Accordingly, if the number of failing nodes is (N−1) or less, it is guaranteed that SCs (S) capable of failover as many as (N−the number of failing nodes) remain for each redundancy group.

Figure 19:
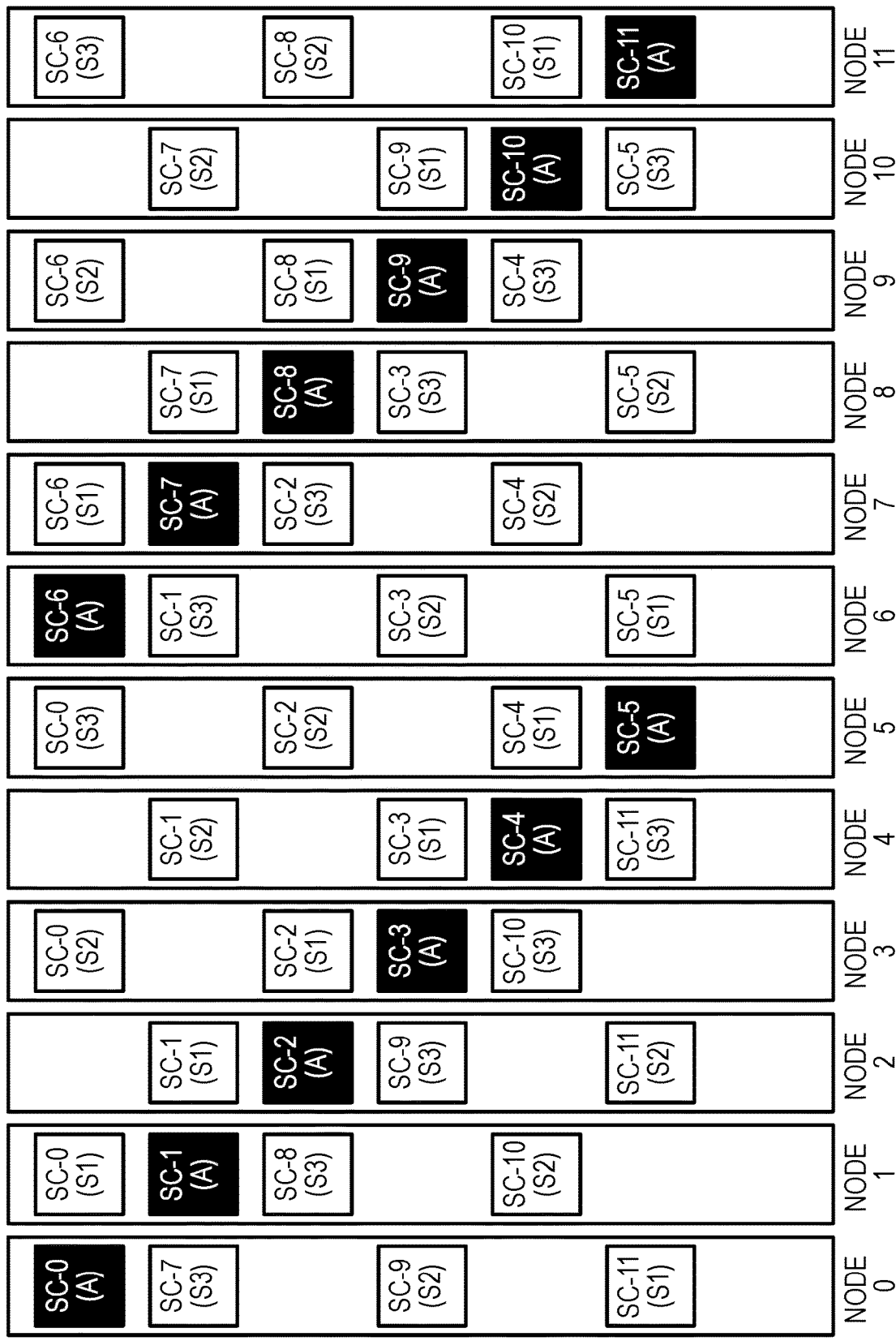
FIG. 19 illustrates an example of arrangement of the storage control unit according to the second embodiment.
Figure 20:
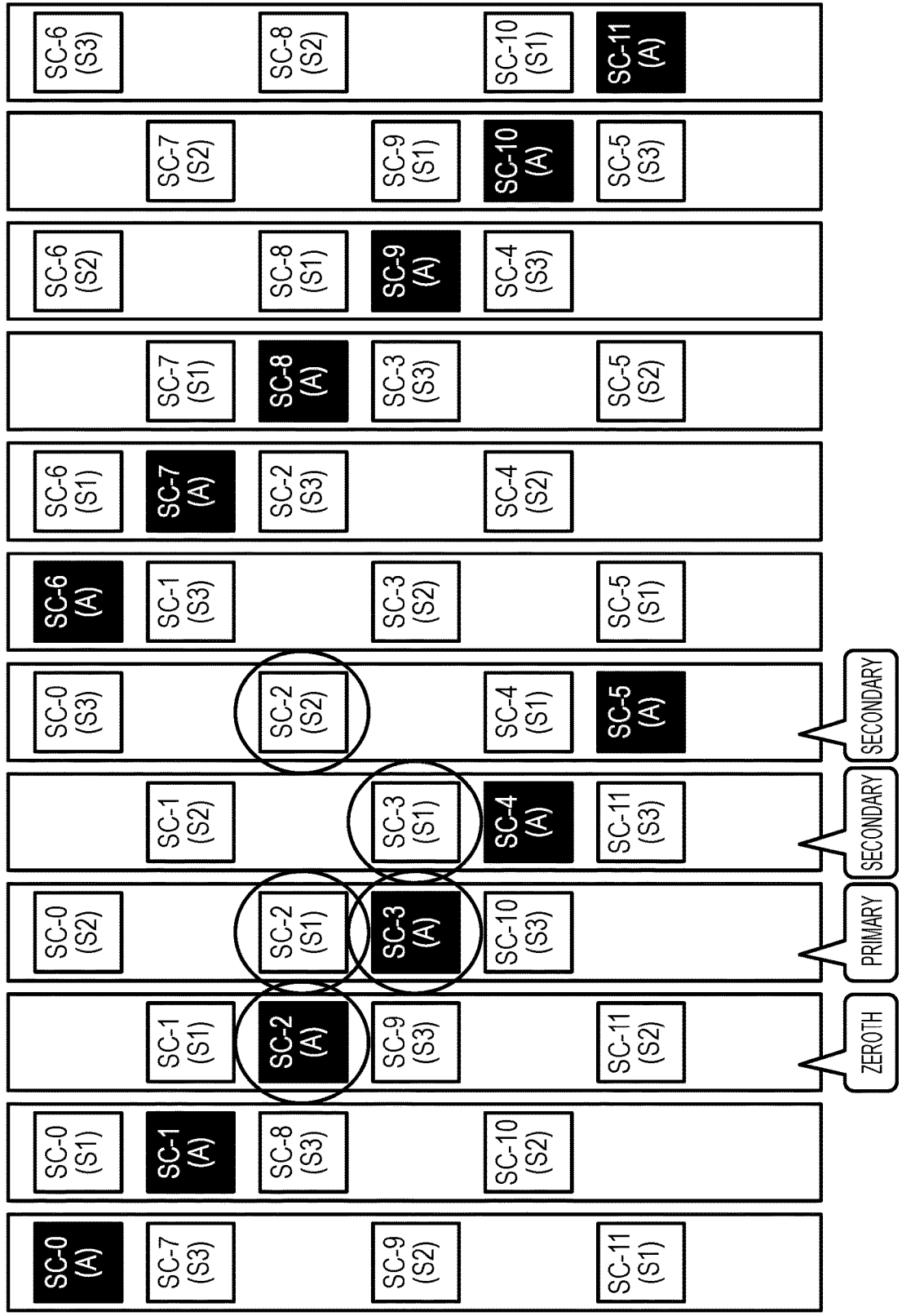
FIG. 20 illustrates an example of arrangement of the storage control unit according to the second embodiment.
Figure 21:
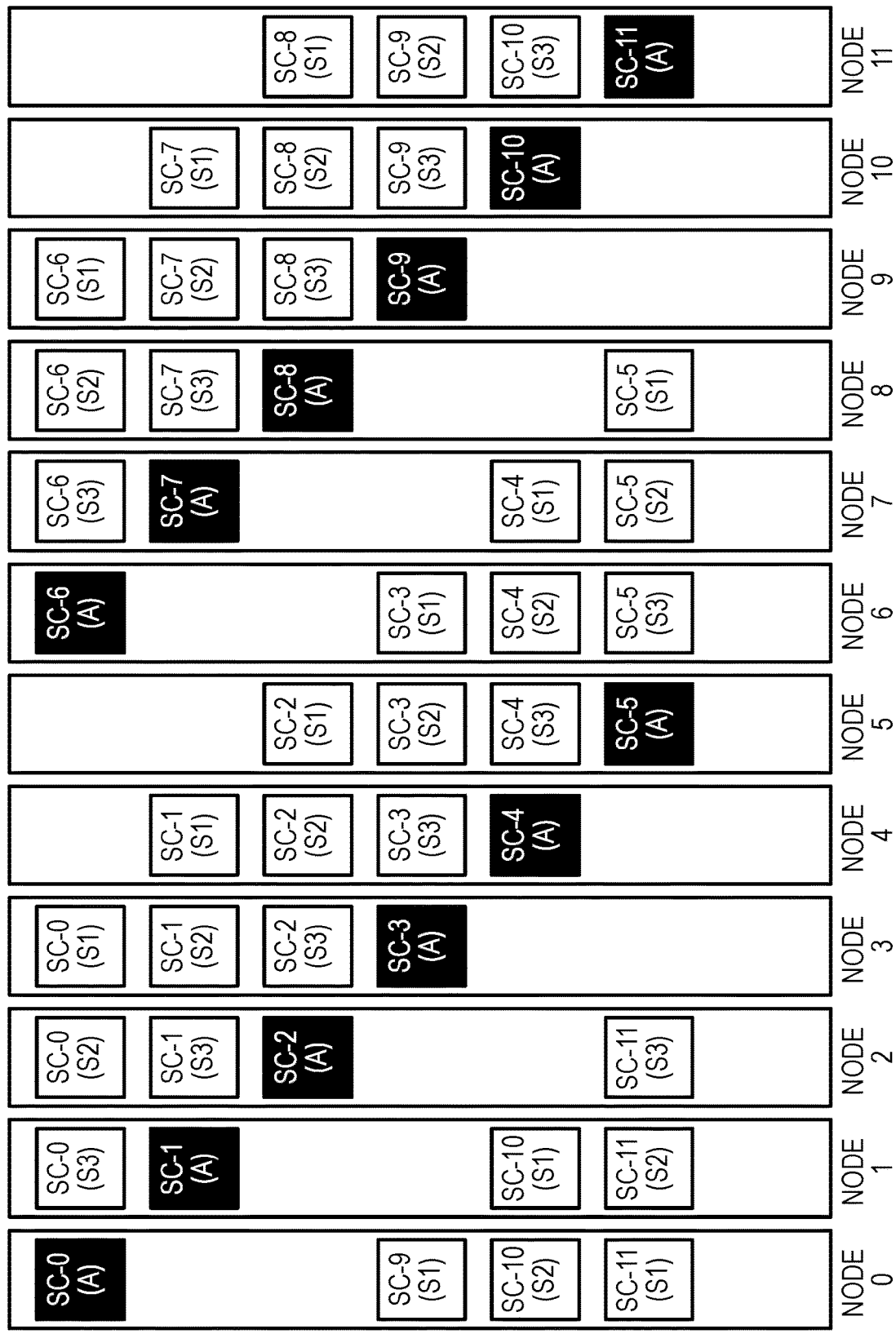
FIG. 21 illustrates an example of arrangement of the storage control unit according to the second embodiment.

FIGS. 19 to 21 are specific arrangement examples in the present embodiment. Similar to the first embodiment, an arrangement destination node number of SC (S) can be generally expressed as follows, for example, when the number of nodes is C.

An arrangement destination of an SC-n (A) is a storage node with a node number n (h=n).

An arrangement destination of an SC-n (Si) is a storage node with a node number ((n+Xi) mod C).

FIG. 19 is an example where $X_1=1$, $X_2=3$, and $X_3=5$. FIG. 20 illustrates a case where Node 2 becomes a secondary failure root node as an example. An SC with a circle indicates an SC (A) at a node that has failed or an SC (S) serving as a failover destination. An SC (S) without a circle, arranged in a storage node having an SC (S) with a circle, is likely to be an SC (S) incapable of failover. When Redundancy Group 2 (SC-2) is used as an example, Storage Nodes 2, 3, 4 and 5 are influential nodes for Redundancy Group 2. Since there is no redundancy group in which three or more SCs (S) are arranged in these four nodes, the SC arrangement condition in the present embodiment is satisfied. An arrangement method illustrated in FIG. 19 can be generalized to quintuplication or higher, and the arrangement condition of the present embodiment is satisfied by setting a value of Xi to $X_1=i*2-1$.

Figure 22:
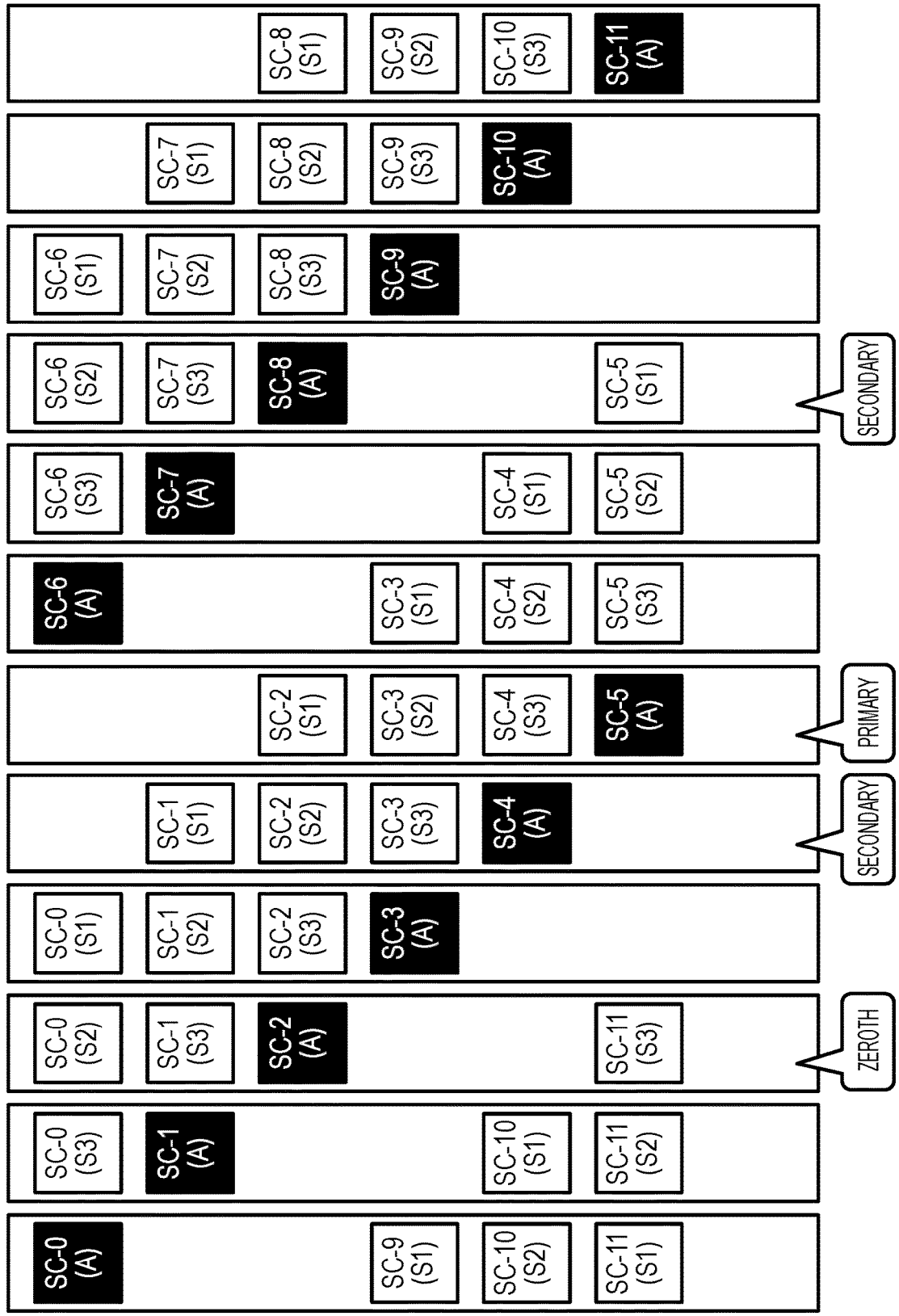
FIG. 22 illustrates an example of arrangement of the storage control unit according to the second embodiment.

FIG. 21 illustrates an example where $X_1=3$, $X_2=2$, and $X_3=1$. FIG. 22 illustrates a case where Node 2 becomes a secondary failure root node (an SC with a circle have the same meaning as that in FIG. 20). When Redundancy Group 2 (SC-2) is used as an example, Storage Nodes 2, 4, 5 and 8 are influential nodes for Redundancy Group 2. Since there is no redundancy group in which three or more SCs (S) are arranged in these four nodes, the SC arrangement condition in the present embodiment is satisfied.

(3) Third Embodiment

A third embodiment will be described. A difference from the first and second embodiments will be mainly described, and common points with the first and second embodiments will be omitted or simplified.

In the third embodiment, a quintuple redundancy group is adopted.

Figure 23:
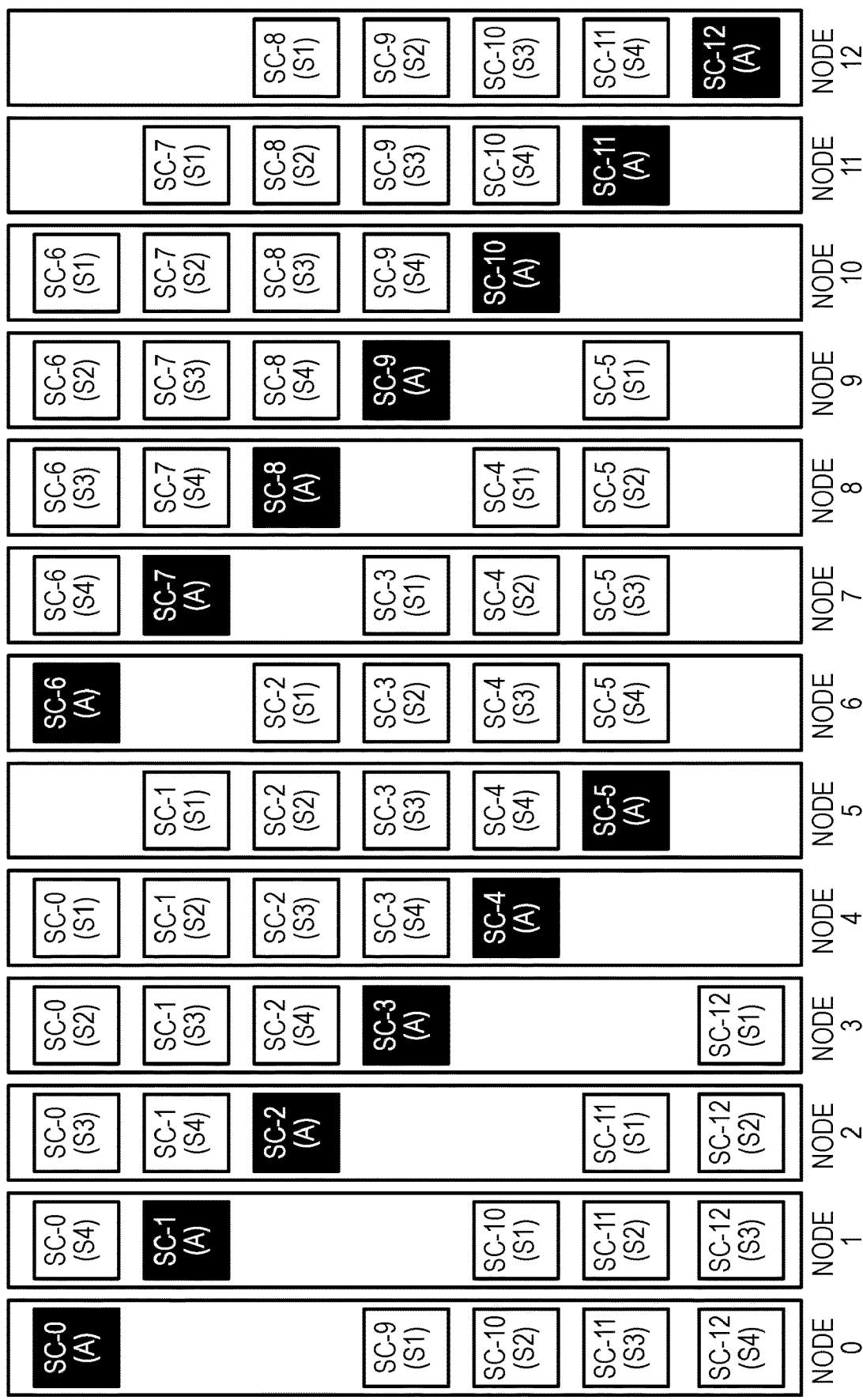
FIG. 23 illustrates an example of arrangement of a storage control unit according to a third embodiment.

FIG. 23 illustrates an example of SC arrangement according to the third embodiment. There are four SCs (S), and $X_1=4$, $X_2=3$, $X_3=2$, and $X_4=1$ according to the example in FIG. 23. FIG. 24 illustrates an example when Node 2 becomes a tertiary failure root node. The influential nodes are seven nodes (Nodes 1, 2, 4, 5, 6, 9, and 10), and there is no redundancy group in which four or more SCs (S) are arranged in these seven nodes, so that the SC arrangement condition is satisfied in the present embodiment. An arrangement method illustrated in FIGS. 21 and 23 can be generalized to N-multiplexing, and the arrangement condition of the present embodiment is satisfied by setting a value of $X_4$ to $X_4=N-i+1$.

As an example of the summary of the above description, the following expressions are possible. That is, a plurality of storage nodes and a storage device are provided. A plurality of redundancy groups each of which is constituted by multiplexed SCs are arranged in the plurality of storage nodes. For each redundancy group, the following description is possible.

Three or more SCs, which are multiplexed SCs that constitute the redundancy group and perform storage control, are arranged in different storage nodes among the plurality of storage nodes.

Among the multiplexed SCs, one or more SCs are SCs (A), and each of the remaining two or more SCs is an SC (S) which is a failover destination of the SC (A), Each of the two or more SCs (S) is associated with a priority to be determined as the failover destination of the SC (A).

When a storage node where the SC (A) is arranged fails, failover within the redundancy group from the SC (A) to SC' (S) is performed based on the priority.

For a plurality of SCs including SCs (A) and SCs (S) that change to be active by the failover in the plurality of redundancy groups arranged in the same storage node, the SCs (S) which can set each of SCs as the failover destination are arranged in different nodes.

Although several embodiments have been described above, these are examples for describing the invention, and there is no intention to limit the scope of the invention only to these embodiments. For example, another physical resource may be adopted in place of the storage node, or another logical resource may be adopted in place of the SC. For example, data may be made redundant on a plurality of drives, one of them may be set as active for access and the other may be set as standby for access only when a failure occurs in the active, and a redundancy group constituted by active and standby, which are copies of these same data, may be configured. Alternatively, a plurality of routes, such as a plurality of network switches and lines, may be bundled for redundancy, and a redundancy group in which a route normally accessed by a communication subject is set as active and the other is set as standby may be adopted.

What is claimed is:

1. A storage system comprising: a plurality of storage nodes each having a memory and a processor; and a storage device, wherein the plurality of storage nodes includes four or more storage nodes, wherein a plurality of redundancy groups each of which is constituted by triplicated storage control programs arranged in the plurality of storage nodes, and for each of the redundancy groups, the triplicated storage control programs, which constitute a redundancy group and are executed by processors to perform storage control, are arranged in three different storage nodes among the plurality of storage nodes and the three different storage nodes form different combinations for each of the redundancy groups, wherein one storage control program out of the triplicated storage control programs is an active program which is active storage control program, and each of the remaining two pieces of storage control program is a standby program which is standby storage control program; each of the two standby programs is associated with a priority to be determined as a failover destination and includes a first standby program to which a failover is performed preferentially, and a second standby program to which a failover is performed from the active program and the first standby program, when a storage node where the active program is arranged fails, failover within the redundancy group from the active program to a standby program with a highest priority is performed, when two of three storage nodes in which the three storage control programs of two redundancy groups are arranged are the same storage nodes, active programs of the two respective redundancy groups are arranged in separate storage nodes of the two same storage nodes or second standby programs of the two respective redundancy groups are arranged in the separate storage nodes of the two same storage nodes; when two of a first three storage nodes in which first three storage control programs of a first redundancy group are arranged in the same storage nodes as two of second three storage nodes in which second three control programs of a second redundancy group, active programs of the two respective redundancy groups are arranged in separate storage nodes of the two same storage nodes or second standby programs of the two respective redundancy groups are arranged in the separate storage nodes of the two same storage nodes; and one of the first three storage nodes and one of the second three storage nodes are separate storage nodes.

2. The storage system according to claim 1, wherein a standby program with a priority 1 in a redundancy group p is arranged in a zeroth-order influential node of a redundancy group α, a standby program with a priority 2 in the redundancy group β is arranged in any storage node other than a primary influential node of the redundancy group α.

3. The storage system according to claim 1, wherein
a number of the storage nodes is equal to a number of the redundancy groups; and
one active program is arranged in each storge node.

4. The storage system according to claim 1, wherein an arrangement condition of a redundancy group α is that at most k standby programs among the two standby programs in the redundancy group α are arranged in k-th order or lower influential nodes of all redundancy groups β for the redundancy group α; a redundancy group β for the redundancy group β is a redundancy group including active programs arranged in m-th order influential nodes of the redundancy group α(m is a natural number and m<N); the m-th order influential nodes of the redundancy group α is a storage node in which a standby program with a priority m in the redundancy group α is arranged; a storage node where the active program is arranged in the redundancy group α is a zeroth-order influential node; and a storage node where a standby program with a priority k (k is a natural number and 1<k<(N−m)) in the redundancy group β for the redundancy group α is arranged is an (m+k)-th order influential node of the redundancy group α.

5. The storage system according to claim 4, wherein
a node number has a serial number is assigned to each of the storage nodes,
a group number n as a serial number is assigned to each of the redundancy groups, and
for a redundancy group n,
an arrangement destination of the active program is a storage node with a node number n (h=n), and
an arrangement destination of the standby program with the priority m is a storage node with a node number ((n+X$_m$) mod C), and
C is a number of the storage nodes.

6. The storage system according to claim 1, wherein when two of the three storage nodes in which the three storage control programs of two redundancy groups are arranged are the same storage nodes, active programs of the two respective redundancy groups are arranged in separate storage nodes of the two same storage nodes.

7. The storage system according to claim 1, wherein when two of the three storage nodes in which the three storage control programs of two redundancy groups are arranged are the same storage nodes, second standby programs of the two respective redundancy groups are arranged in separate storage nodes of the two same storage nodes.

8. The storage system according to claim 1, wherein regarding the redundancy groups, there are two redundancy groups for which two storage control programs out of three control programs are arranged in the same storage nodes and the two storage storage nodes have different combinations.

9. A storage system construction method comprising: causing a computer to refer to configuration information that represents a configuration regarding a plurality of storage nodes, wherein the plurality of storage nodes includes four more or more storage nodes; and causing the computer to arrange a plurality of redundancy groups each of which is constituted by triplicated storage control programs in the plurality of storage nodes based on the configuration information, wherein, for each of the redundancy groups, the triplicated storage control programs, which constitute a redundancy group and are executed by processors to perform storage control, are arranged in three different storage nodes among the plurality of storage nodes and the three different storage nodes form different combinations for each of the redundancy groups, wherein one storage control program out of the triplicated storage control programs is an active program which is active storage control program, and each of the remaining two pieces of storage control software is a standby program which is standby storage control program, each of the two standby programs is associated with a priority to be determined as a failover destination and includes a first standby program to which a failover is performed preferentially, and a second standby program to which a failover is performed from the active program and the first standby program, when two of three storage nodes in which the three storage control programs of two redundancy groups are arranged are the same storage nodes, active programs of the two respective redundancy groups are arranged in separate storage nodes of the two same storage nodes or second standby programs of the two respective redundancy groups are arranged in the separate storage nodes of the two same storage nodes; when two of a first three storage nodes in which first three storage control programs of a first redundancy group are arranged in the same storage nodes as two of second three storage nodes in which second three control programs of a second redundancy group, active programs of the two respective redundancy groups are arranged in separate storage nodes of the two same storage nodes or second standby programs of the two respective redundancy groups are arranged in the separate storage nodes of the two same storage nodes; and one of the first three storage nodes and one of the second three storage nodes are separate storage nodes.

* * * * *